United States Patent
Permude

(10) Patent No.: US 9,553,998 B2
(45) Date of Patent: Jan. 24, 2017

(54) SHARING GROUP NOTIFICATION

(71) Applicant: Oracle International Corporation, Redwood Shores, CA (US)

(72) Inventor: Avinash Permude, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/620,895

(22) Filed: Feb. 12, 2015

(65) Prior Publication Data

US 2015/0358484 A1    Dec. 10, 2015

Related U.S. Application Data

(60) Provisional application No. 62/009,902, filed on Jun. 9, 2014.

(51) Int. Cl.
*H04M 11/00* (2006.01)
*H04M 15/00* (2006.01)

(52) U.S. Cl.
CPC ....... *H04M 15/863* (2013.01); *H04M 15/7652* (2013.01); *H04M 15/844* (2013.01); *H04M 15/852* (2013.01)

(58) Field of Classification Search
CPC ............................... G06Q 30/04; H04M 15/66
USPC ... 455/406, 405, 436; 705/304, 65; 709/224, 709/204; 707/769
See application file for complete search history.

(56) References Cited

U.S. PATENT DOCUMENTS

| | | | |
|---|---|---|---|
| 6,295,447 B1 | 9/2001 | Reichelt et al. | |
| 8,411,831 B2 | 4/2013 | Thompson | |
| 8,577,701 B1 * | 11/2013 | Howard | G06Q 40/00 705/35 |
| 8,640,188 B2 | 1/2014 | Riley | |
| 8,737,957 B2 | 5/2014 | Raleigh | |
| 9,398,434 B2 | 7/2016 | Piro, Jr. | |
| 2008/0014904 A1 * | 1/2008 | Crimi | G06Q 30/04 455/406 |
| 2009/0207994 A1 | 8/2009 | Bruce et al. | |
| 2011/0225113 A1 | 9/2011 | Mann | |
| 2012/0101952 A1 * | 4/2012 | Raleigh | G06Q 30/016 705/304 |
| 2013/0212065 A1 | 8/2013 | Rahnama | |
| 2013/0282626 A1 | 10/2013 | White et al. | |
| 2013/0304616 A1 | 11/2013 | Raleigh | |
| 2015/0019514 A1 | 1/2015 | Forster et al. | |
| 2015/0148003 A1 | 5/2015 | Piro, Jr. et al. | |
| 2015/0148004 A1 | 5/2015 | Piro, Jr. | |
| 2015/0149625 A1 | 5/2015 | Piro, Jr. et al. | |
| 2015/0181045 A1 | 6/2015 | Lang et al. | |

(Continued)

OTHER PUBLICATIONS

Non-Final Office Action for U.S. Appl. No. 14/272,700 (Mar. 23, 2016).

(Continued)

*Primary Examiner* — Kiet Doan

(74) *Attorney, Agent, or Firm* — Jenkins, Wilson, Taylor & Hunt, P.A.

(57) ABSTRACT

A method, computer program product, and apparatus are disclosed. The method includes determining whether a shared balance threshold has been breached, and notifying a member of a sharing group, in response to a determination that the balance threshold has been breached. The shared balance threshold is for the sharing group, which includes a number of members.

8 Claims, 14 Drawing Sheets

Charging Architecture 300

(56) References Cited

U.S. PATENT DOCUMENTS

2015/0206116 A1 7/2015 Bess et al.
2015/0310512 A1 10/2015 Malaksamudra et al.
2015/0326497 A1 11/2015 Guionnet et al.
2015/0356117 A1 12/2015 Kaemmerer et al.

OTHER PUBLICATIONS

Final Office Action for U.S. Appl. No. 14/259,503 (Jan. 28, 2016).
Non-Final Office Action for U.S. Appl. No. 14/199,457 (Oct. 6, 2015).
Non-Final Office Action for U.S. Appl. No. 14/259,503 (Aug. 17, 2015).
3GPP, "Digital cellular telecommunication system (Phase 2+); Universal Mobile Telecommunications System (UMTS); LTE; IP Multimedia Subsystem (IMS) Service Continuity; Stage 2," Technical Specification, ETSI TS 123 237 V11.9.0, Release 11, pp. 1-170 (Sep. 2013).
"Synchronous Optical Network (SONET) Transport Systems: Common Generic Criteria," Telcordia Technologies Generic Requirements, GR-253-CORE, Issue 4, pp. 1-697 (Dec. 2005).
"American National Standard for Telecommunications—Digital hierarchy—Electrical interfaces," American National Standards Institute (ANSI), ANSI T1.102-1987, pp. 1-31 (Aug. 27, 1987).
Final Office Action for U.S. Appl. No. 14/199,457 (May 25, 2016).
Notice of Allowance and Fee(s) Due for U.S. Appl. No. 14/490,051 (Mar. 18, 2016).
Applicant-Initiated Interview Summary for U.S. Appl. No. 14/490,051 (Dec. 17, 2015).
Non-Final Office Action for U.S. Appl. No. 14/490,051 (Oct. 9, 2015).
"Overview of 3GPP Release 11 V0.2.0 (Sep. 2014)," ETSI Mobile Competence Centre, 2014.
"Overview of 3GPP Release 99, Summary of all Release 99 Feature," ETSI Mobile Competence Centre, 2004.
"ANSI T1.107-200x," Digital Hieracrchy—Formats Specifications, American National Standard for Telecommunications, 2001.

* cited by examiner

SHARING GROUP NOTIFICATION

CROSS-REFERENCE TO RELATED APPLICATIONS

The present patent application claims priority to Provisional Patent Application Ser. No. 62/009,902, filed Jun. 9, 2014, and entitled "Sharing Group Notification," which is hereby incorporated by reference herein, in its entirety and for all purposes.

FIELD OF THE INVENTION

The present disclosure relates to transaction processing systems, and more particularly, to performing transactions that support group notifications.

BACKGROUND OF THE INVENTION

Service providers are experiencing ever-growing service usage by subscribers. For example, a service provider providing cellular telephone service can provide the requisite service, in part, by implementing a charging and billing system (or more simply, a charging system), in which subscribers to the cellular telephone service are charged for their service usage. An example charging system may implement a policy and charging control solution, such as that developed under 3GPP™ ($3^{rd}$ Generation Partnership Project) IPMS (Internet Protocol Multimedia Subsystems), among other such approaches that support various charging system business models, in the field of cellular telephone service, other communications services (e.g., satellite telephony, messaging, data communications, or the like), or in other fields (e.g., utilities, transportations, and so on).

To attract new users to their services, service providers continue to devise new offers to retain and grow their subscriber base. In the field of communications, one such recent development is concept of a "user group," the members of which share a common "pool" of one or more balances, which can be used to purchase the desired service(s). The "user group" can represent, for example, members of a family or employees of a corporation. Service providers offer services to groups of one or more subscribers in order to allow such services to be shared between the subscribers of one or more such groups.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Figure 1:
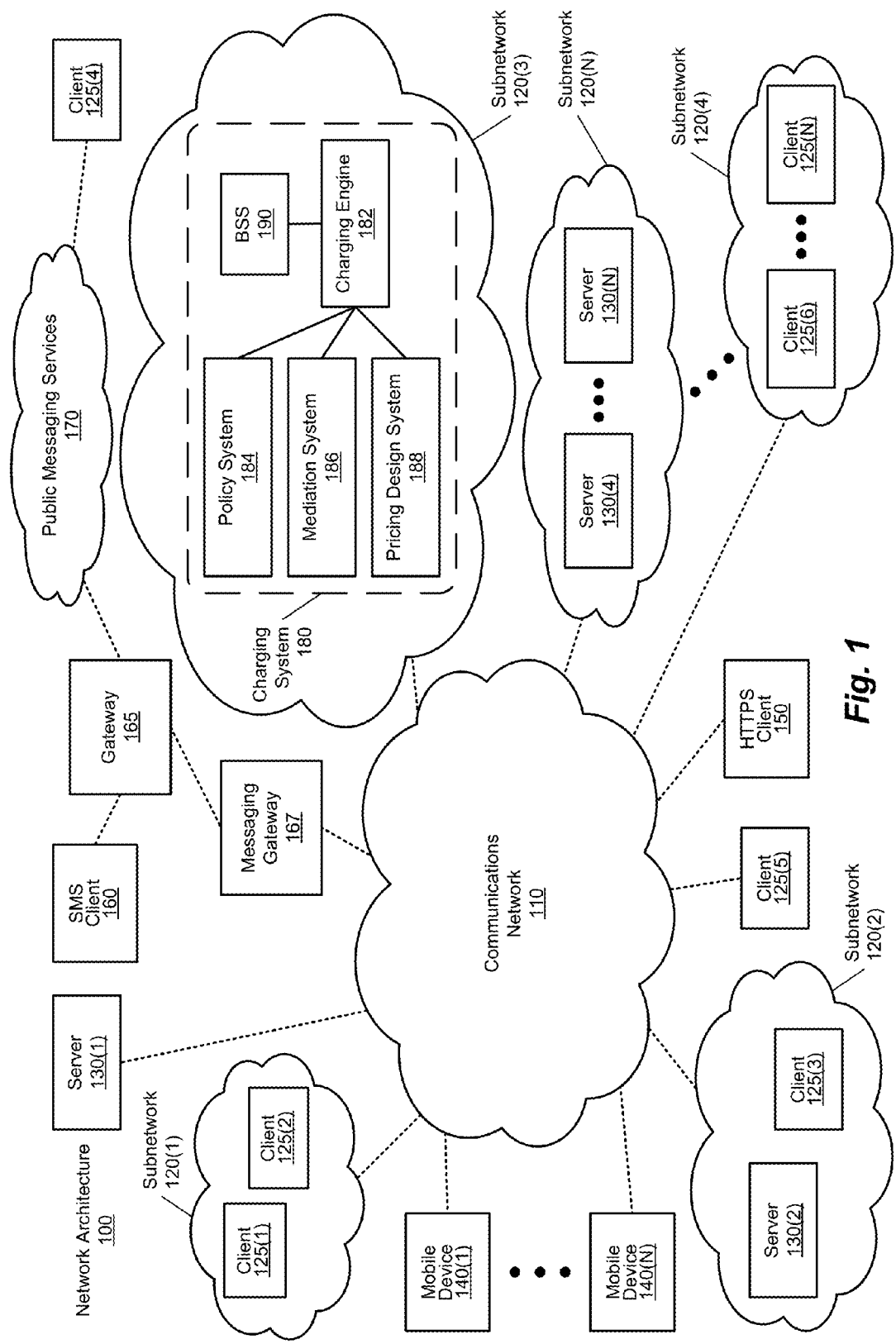
FIG. 1 is a simplified block diagram illustrating an example of a network architecture that includes a charging system according to embodiments of the methods and systems disclosed herein.

The following is intended to provide a detailed description of an example of the invention and should not be taken to be limiting of the invention itself. Rather, any number of variations may fall within the scope of the invention which is defined in the claims following the description.
Introduction Methods and systems such as those described herein allow transactions to be performed by providing a charging engine with the ability to generate various notifications for members of a sharing group during processing of on-line/off-line charging requests.

As noted, service providers, in the current competitive market, are constantly devising new offers and plans to retain and grow their subscriber base. One example is the recent development of the "user group." Subscribers who are members of such a user group share one or more "balances" (e.g., free cellular telephone minutes, pre-paid data services, some number of text messages, and/or the like, either taken alone or in combination), which is referred to herein as a shared balance. Any one (or more) of a given subscriber's balances can be individual (non-shared) or shared, and such balances (individual or shared) can represent a balance for any one of a number of services.

A "user group" such as that described herein (also referred to herein as a "sharing group") can include the members of a family, employees of a corporation or other organization, or subscribers in with any manner of shared relationship(s)

therebetween. When a member of such a user group conduct an active usage session, and their shared balance for the service reaches a state which mandates the generation of a notification, generation of such a notification for one or more members of the group (e.g., including, possibly, the member whose activity produced the notification, but at least one other of the sharing group's members, as well), is desirable. Without such notifications, situations can arise in which other sharing group members are unaware of the state of such balances and proceed to use the given service, based on mistaken assumptions regarding those balances (examples of which are described in greater detail in connection with FIG. 5, below). Thus, in view of the foregoing, it would be desirable to provide notification to members of sharing groups, even if such members are not the active user. Preferably, such functionality should be provided with minimal to no impact on the resources required therefor.

A typical example of such scenarios is a family of four, in which one parent sponsors data service for the other parent and two children. When a data session of any of these users results in the breach of their shared balance (e.g., the shared balance has been reached, exceeded, is within or exceeds a given range, or otherwise meets one or more criteria that indicate that the members of the sharing group to which the shared balance applies, should be notified), one or more (possibly all) of the family members should receive a notification. While generation of a notification to the subscriber whose session has changed the state of shared balance is helpful, failing to alert the other subscribers in the sharing group is problematic. To address such situations, methods and systems such as those described herein maintain information regarding the subscribers in the sharing group, and when charging of a particular session of any of these subscribers results in a state change in the shared balance, an aggregate notification is generated. Such an aggregate notification can be consumed by any mediation/third party systems (including mediation/third party applications, online and offline network mediation software programs, and other such network elements), and so generate notification to the other subscribers by way of their preferred communications channel (e.g., simple messaging service (SMS), email, and/or other such communications channels). A typical use case in such scenarios is the generation of a "threshold breach" or "bill shock" notification for a group of subscribers or subset thereof. Having such notifications sent to the members of a group of subscribers enables the members to adjust their behavior based on the usage of others. Subscribers are thus able to be more aware of the state of the balances within the group, and act accordingly, in view of their preferences.

Methods and systems such as those described herein provide a number of advantages. Among such advantages is the prevention of untoward scenarios such as those described, where non-active sharing group members are unpleasantly surprised as a result of the use of certain services by other members of the sharing group, or are not afforded the opportunity to proceed in a manner in which such other members might have proceeded, had they possessed knowledge of the active sharing group member's actions. Also, the notification generated can be consumed by any appropriate mediation server or a third-party application. This allows a charging engine thus configured, for example, to send only one (or a small number) of notification(s). Even sending a small number of such notifications (e.g., even a number of notifications that is simply less than the number of member in the given sharing group to which such notifications are to be sent) can result in a significant improvement over a scenario in which a charging engine is forced to generate and send a notification for each member in the given sharing group, particularly when the number of members in the sharing group becomes large. Thus, while methods and systems such as those described herein can be applied on a subscriber-by-subscriber basis, when generating and sending such notifications (e.g., notifications generated by the given charging engine, and sent from that charging engine to, e.g., a mediation system of the network in question), the performance of such communications can be improved significantly by reducing the number of such notifications that such a charging engine might need to generate and send (and the mediation system (or other such network system) receive and process). By sending only one (or a small number) of notification(s), the computational load (as well as other resource requirements) are offloaded from the charging engine, thereby allowing such notifications to be sent quickly (effectively, in "real time"). Moreover, a charging engine according to such methods and systems need generate only a single notification containing information regarding the subscribers who are members of the given sharing group (or even some subset thereof) without any extra input/output or latency overhead, since the requisite members can be identified in that message. The notification generated can, as noted, be consumed by mediation server or a third-party application, and allows the mediation server/third-party application to then generate (the potentially numerous) notifications to end users.

Yet another advantage of methods and systems such as those described herein, resulting from the efficiencies provided thereby, is the ability not only to handle more subscribers is a given sharing group, but also to configure more thresholds for the sharing balance(s) associated with a given sharing group. Such thresholds can be set (by design or configuration) for a given level of service usage (e.g., remaining balance of minutes, dollar amount consumed, remaining number of texts before charges will apply, and many other such alternatives, including combinations thereof), to alert all subscribers in the sharing group or some subset thereof, to allow for incrementally different ones of the subscribers in the sharing group to be alerted, and other such alternatives, taken alone or in any desirable configuration (certain examples of which are described subsequently). While an increase in the number of thresholds configured for a given sharing balance can naturally lead to an increase in the number of notifications, the relationship (from the perspective of the charging engine) is only an order N ($O(n)$) situation (the charging engine need only generate one notification for each breach) in embodiments such as those described herein, rather than an order $N^2$ ($O(n^2)$) situation (where the charging engine must generate a notification for each subscriber for each breach). The advantages of methods and systems such as those disclosed herein are thus clear.

Examples of Charging Architectures

FIG. 1 is a simplified block diagram illustrating an example of a network architecture that includes a charging system according to embodiments of the methods and systems disclosed herein. Thus, FIG. 1 depicts a network architecture 100 as including a communications network (depicted in FIG. 1 as a communications network 110), which is configured to couple numerous of the elements of network architecture 100 to one another. In that regard (and among a number of such facilities provided thereby), communications network 110 supports communications between a number of subnetworks (depicted in FIG. 1 as subnetworks 120(1)-(N)). Subnetworks 120(1)-(N), in turn, can include a number of components, such as one or more clients (depicted in FIG. 1 as clients 125(1)-(N)) and/or servers (depicted in FIG. 1 as servers 130(1)-(N)). Clients 125(1)-(N) and/or servers 130(1)-(N) can, for example, be implemented using computer systems such as those described generically in connection with FIGS. 13 and 14. Communications network 110 thus communicatively couples subnetworks 120(1)-(N) to one another, thereby allowing clients 125(1)-(N) and servers 130(1)-(N) to communicate with one another (and can, in certain embodiments, provide for the servers of subnetworks 120(3) and 120(N), for example, to operate as cloud-based server systems). As is depicted in FIG. 1, clients 125(1)-(N) can be communicatively coupled to one another and to servers 130(1)-(N) as part of one of subnetworks 120(1)-(N), or directly via communications network 110. Similarly, servers 130(1)-(N) can be coupled via communications network 110 via a direct connection to communications network 110, or as part of one of subnetworks 120(1)-(N).

Network architecture 100 also provides for communication via communications network 110 using one or more other devices. Such devices can include, for example, a general packet radio service (GPRS) device (e.g., depicted in FIG. 1 as mobile devices 140(1)-(N)) (e.g., a "smart phone," a "tablet" computer, or other such mobile device), a secure web client (e.g., a laptop computer running a secure hypertext transfer protocol (hypertext transfer protocol secure, or HTTPS), and depicted in FIG. 1 as an HTTPS client 150), and a basic cellular phone (e.g., using standard texting or other communication protocols, and depicted in FIG. 1 as a simple messaging service (SMS) client 160). Support for GPRS clients, SMS clients, HTTP clients, and the like thereby provide users with communication functionality according to an embodiment in a mobile environment. SMS client 160 can communicate via communications network 110 via several channels. SMS client 160 can communicate directly, for example, with a gateway 165, which, in turn, communicates with communications network 110 via a messaging gateway 167 and, optionally, elements within subnetwork 120(3), for example. Alternatively, SMS client 160 can, via gateway 165, communicate with subnetwork 120(3) (and so, communications network 110) via public messaging services 170 to which gateway 165 and subnetwork 120(3) are connected. As is also depicted in FIG. 1, a client 125(4) is also able to communicate via communications network 110 by way of public communication services 170 and subnetwork 120(3).

In order to support the aforementioned communications, as well as other communications within network architecture 100 according to various embodiments, subnetwork 120(3) includes a charging system 180, as well as (optionally) providing for a number of clients and/or other servers (not shown), in the manner of subnetworks 120(1)-(N). Charging system 180 supports communications within network architecture 100 by way of receiving usage information from and providing control information to the elements of network architecture 100, maintaining usage information, and performing other such functions. Such usage information can include, for example, accounting information, service usage, and other relevant information, as may relate to voice telephone calls, data transfers, messaging, and other such communications, as may occur between various of the elements of network architecture 100.

Charging system 180 includes a number of elements in support of these functions. Such elements include a charging engine 182, which is central to the functionality provided by charging system 180. Charging engine 182 provides information to and receives information from other elements of charging system 180, which can include, for example, a policy system 184, a mediation system 186, a pricing design system 188, and business support systems (BSS) 190. In so doing, charging engine 182 provides support for functions provided by policy system 184, mediation system 186, pricing design system 188, and BSS 190. The functionality provided by charging engine 182, policy system 184, mediation system 186, pricing design system 188, and BSS 190 are described in further detail subsequently herein.

Briefly, policy system 184 includes functionality that comprehends the design of policies to control operational aspects of charging system 180 by defining and enforcing (via, e.g., charging engine 182 and other elements of charging system 180) policies and rules resulting therefrom on the users of services provided via communications network 110 and other elements of network architecture 100. Similarly, pricing design system 188 can be used to design and implement pricing structures for the services provided within network architecture 100 by a service provider, allowing such a service provider to achieve fair pricing for their services, while helping to maintaining the profitability of those services. Business support systems 190 interact with charging engine 182 in order to allow the service provider to generate invoices, control access to the network, access other elements of charging system 180, and the like, as well as open, maintain, and close subscriber accounts as needed.

Mediation system 186 interacts with charging engine 182 in order to provide functionality related to controlling certain aspects of the provision of services throughout network architecture 100. Thus, in one embodiment mediation system 186 receives charging events from elements of network architecture 100, extracts event attributes, and generates a usage request. Mediation system 186 then submits the usage request to charging engine 182, which makes the requisite determinations and sends a usage response, indicating the outcome(s) of those determinations (e.g., granting or denying the usage request), to mediation system 186. Mediation system 186, in turn, interacts with various elements of network architecture 100 to effect the outcome(s) indicated by charging engine 182. As will be appreciated in light of the present disclosure, a service provider such as that described herein (e.g., a telecommunication service provider, a shipping service provider, a utility service provider, and the like) provides subscribers with access to one or more service products. A service provider can implement a charging system that is configured to define and enforce conditions indicating how subscribers should be charged for service usage.

It will be appreciated that, in light of the present disclosure, the variable identifier "N" is used in several instances in various of the figures herein to more simply designate the final element of a series of related or similar elements. The repeated use of such variable identifiers is not meant to imply a correlation between the sizes of such series of elements. The use of variable identifiers of this sort in no way is intended to (and does not) require that each series of elements have the same number of elements as another series delimited by the same variable identifier. Rather, in each instance of use, variables thus identified may represent the same or a different value than other instances of the same variable identifier.

As will be appreciated in light of the present disclosure, processes according to concepts embodied by systems such as those described herein include one or more operations, which may be performed in any appropriate order. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable storage media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Figure 2:
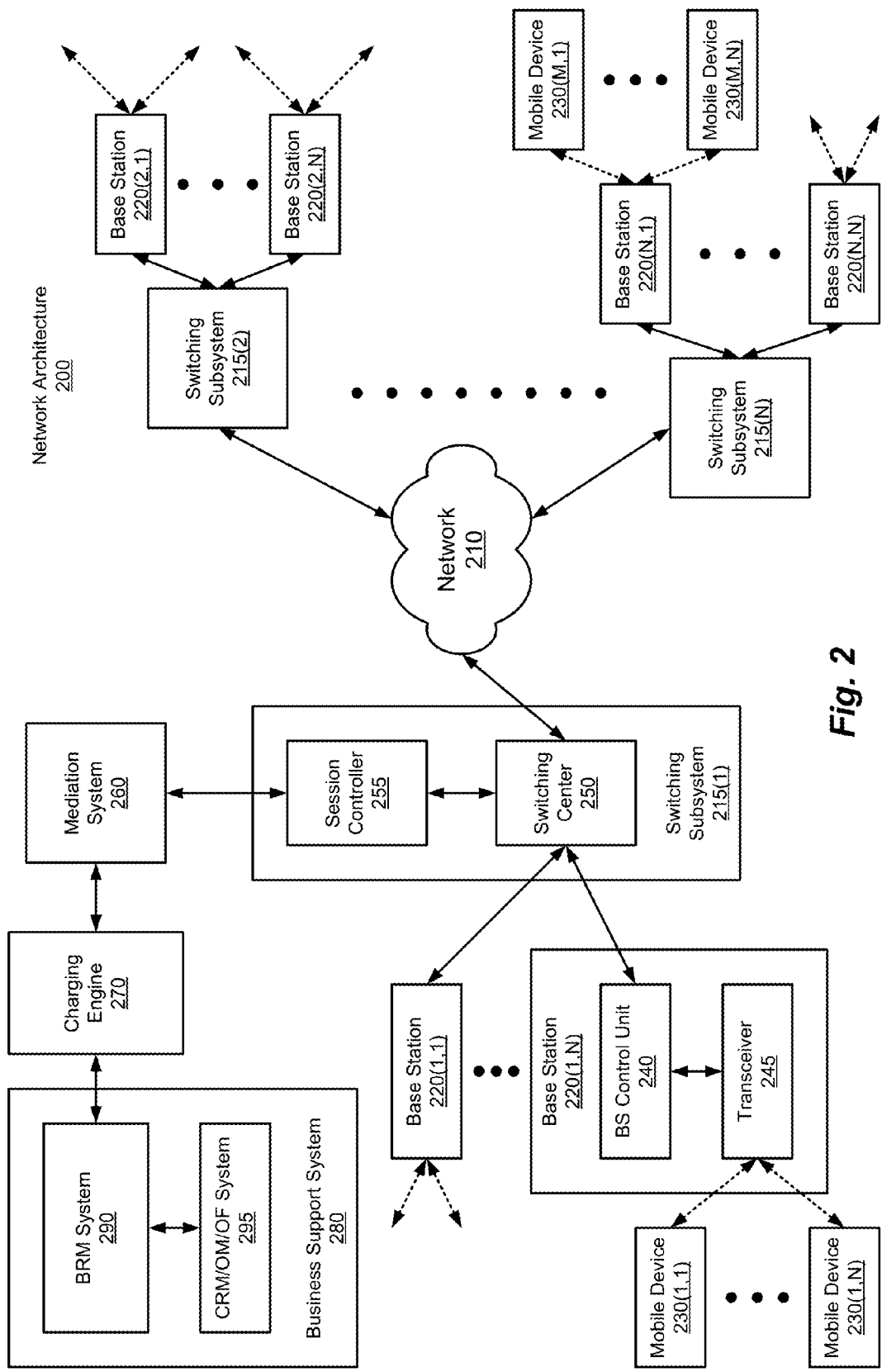
FIG. 2 is a simplified block diagram illustrating an example of a network architecture, according to embodiments of the methods and systems disclosed herein.

FIG. 2 is a simplified block diagram illustrating an example of network architecture, according to embodiments of the methods and systems disclosed herein. A network architecture 200 such as that depicted in FIG. 2 can include a number of systems and subsystems, some of which are comparable to those depicted in network architecture 100. For example, network architecture 200 includes a network 210, which communicatively couples a number of switching subsystems (depicted in FIG. 2 as switching subsystems 215(1)-(N)) to one another. Switching subsystems 215(1)-(N) couple a number of base stations (depicted in FIG. 2 as base stations 220(1,1)-(N,N)) to one another via network 210. In turn, base stations 220(1,1)-(N,N) provide a number of mobile devices (depicted in FIG. 2 as mobile devices 230(1,1)-(M,N)) with access to the communications facilities of network architecture 200. Such communications facilities can, for example, be provided in the manner of various ones of mobile devices 140(1)-(N), SMS client 160, clients 125(1)-(N), and other such elements of FIG. 1.

In the example depicted in FIG. 2, base stations 220(1,1)-(N,N) provide access between ones of mobile devices 230(1,1)-(M,N) using, for example, radio frequency communications. That being the case, base station 220(1,N) is depicted as including a base station control unit 240 and a transceiver 245. As can be seen in FIG. 2, transceiver 245 supports wireless communications with mobile devices 230(1,1)-(1,N), and provides these mobile devices with access to other such mobile devices on the network (e.g., via switching subsystem 215(1) and network 210). Base station control units such as base station control unit 240 handle connections (e.g., voice, data, messaging, and other such communications) between various ones of mobile devices 230(1,1)-(1,N), as well as to other elements of network architecture 200. For example, in a wireless (e.g., cellular) telephone system, the signals from one or more mobile telephones in a given area (typically referred to as a cell) are received at a base station such as base station 220(1,N), which then connects the call to other elements of network architecture 200. In such a case, elements of network 210 can include carrier, microwave radio, and/or switching facilities that connect calls from various ones of mobile devices 230(1,1)-(M,N) to various others of mobile devices 230(1,1)-(M,N).

Next, such a connection transits a switching center such as switching center 250 of switching subsystem 215(1). Switching center 250 performs functions such as switching incoming and outgoing voice and data connections, as well as interacting with a session controller 255 of switching subsystem 215(1), in order to support communications (e.g., voice calls) and tracking of such activity for purposes of billing and the like. To this end, session controller 255, as its name implies, controls communications sessions transiting switching centers such as switching center 250, and supports tracking of communications sessions for billing purposes (e.g., charging), communications session monitoring, voice and data traffic management, failure detection and recovery, and other such functions.

Switching subsystem 215(1), via session controller 255, communicates with a mediation system 260. Mediation system 260, depicted in FIG. 2 as an online mediation system, provides functionality related to the conversion of data of certain data types to other data types, typically for billing purposes, and can be implemented using one or more servers (a server, in turn, being implemented using one or more computing devices). A mediation system such as mediation system 260, among other functions, processes usage detail records (more specifically, call detail records (CDRs)) and handle information regarding voice and data calls such as call duration, peak time information, and the like.

Mediation system 260 is communicatively coupled to both one or more session controllers such as session controller 255, and a charging engine 270 (described subsequently). When a subscriber wishes to utilize a service, the subscriber's device (e.g., one of mobile devices 230(1,1)-(1,N)) attempts to make a connection, resulting in a request for the service (a service request) being sent to mediation system 260. Mediation system 260 processes call detail records and other such information received from session controller 255. A message processing service module within mediation system 260 generates a corresponding usage request and routes the usage request to the appropriate charging component of charging engine 270. Such a charging request includes a payload that contains information (e.g., from the relevant CDR(s)) in the form of attributes about the subscriber's service usage, such as the type of service being utilized and service usage measurements (e.g., volume-, time-, or event-based service usage measurements), and can be implemented using one or more servers, as well. In response, charging engine 270 utilizes the payload to perform the appropriate operations (e.g., charging the subscriber, performing authorization operations, and/or the like). Charging engine 270, which can perform charging functions for both offline and online charging, receives and operates on the information received from mediation system 260. Charging engine 270 then responds to the service request received from mediation system 260 with a response (a usage response) that indicates, for example, whether the service request is granted or denied.

In certain embodiments, charging engine 270 also provides information regarding communications sessions to a business support system (BSS) 280. BSS 280, in turn, includes a billing and revenue management (BRM) system 290 and a customer relationship management (CRM)/order management/order fulfillment system 295. Thus, in addition to maintaining information about and performing calculations regarding subscriber's use of services within network architecture 200, charging engine 270 provides communication providers with the ability to not only track usage of their network, but also control such usage. Thus, charging engine 270 provides business support system 280 with information regarding, for example, call detail records, for purposes of billing, accounting, and the like. As will be apparent in light of the present disclosure, billing and revenue management system 290 uses this information to generate information to subscribers, provide subscribers with information as to their accounts, and other such client-facing functions. Access to billing and revenue management system 290 can be had via CRM/ON/OF system 295, which provides a variety of functions relevant to the provision of services to subscribers, as well as subscriber access to accounts (e.g., via the web, or the like).

For service providers that provide subscribers with communications services using network architectures such as network architecture 200, latency in processing communications transactions is unacceptable because service quality is dependent upon the speed with which a service transaction (or an exchange of a usage request message and a usage response message) is completed, such as a service that cannot be provided to a subscriber until the subscriber or particular service usage (e.g., an event) is authorized by a charging engine. For example, a subscriber may not be able to make a cellular telephone call under a pre-paid service plan until the charging engine verifies that the subscriber has enough credit balance to initiate the call. In such a charging system, a service provider may define a performance goal of a maximum service transaction latency time of 50 milliseconds in the charging system, where latency of a service transaction is measured from the time a service request is sent to the charging engine from the mediation system until the time a corresponding service response is received at the mediation system from the charging engine.

And as the volume of communications sessions increases, the demands placed on such systems only increases, causing delays to lengthen and throughput levels to fall. Further, as the number of subscribers increases, the number of service transactions that need to be processed by the charging engine also increases, which in turn requires additional (and expensive) computing resources to monitor the latency of those service transactions. As a result, processing latencies increase exponentially, as the number of subscribers (and so service transactions) grew. For example, with 10 subscribers executing 10 service transactions each, 100 total service transactions would need to be processed. With 10 times that number of subscribers (100 subscribers) and service transactions (100 per subscriber), the total number of service transactions balloons to 10,000. As will be appreciated, then, subscriber experience must remain a focus when designing such systems.

Further, not only is subscriber experience impacted by the speed with which such transactions are processed, but such communications are typically held to requirements set out in any number of applicable standards. The problems caused by the aforementioned exponential growth are only compounded when the need to service such transactions quickly to meet the requirements of standards is taken into account. For example, with 10 subscribers executing 10 service transactions each, 100 total service transactions would need to be processed (and profiled). With 10 times that number of subscribers (100 subscribers) and service transactions (100 per subscriber), the total number of service transactions balloons to 10,000. The problems caused by such exponential growth are only compounded when the need to service such service transactions quickly is taken into account (e.g., within the relevant time constraints, such as the 50 ms, 230 ms, and 2 s constraints mandated to avoid Carrier Group Alarms (CGAs) in the case of voice telephone calls adhering to various relevant standards (e.g., including, but not limited to, 3GPP™ IMS (and more particularly, 3GPP™ (Phases 1 and 2, and Releases 96-99 and 4-11)), Bell Communications Research (Bellcore; now Telcordia) General Requirements and Industry Standards (GR) GR-499, Bellcore GR-253 (including GR-253: Synchronous Optical Network (SONET) Transport Systems, Common Generic Criteria, Issue 5 [Bellcore, October 2009]), and ANSI (American National Standards Institute) T1.102, and the timing requirements therein, all of which are included herein by reference, in their entirety and for all purposes). If such increases in load are not addressed by the techniques employed, the processing overhead incurred while processing an ever-greater number of service transactions will slow the charging engine's processing of those service transactions, lengthening latency times and reducing throughput. Thus, in the case of time-critical services (e.g., voice telephone communications), the number of subscribers and service requests, along with the requirements of the relevant standards, quickly results in situations that become unworkable. These and other limitations and problems are addressed by systems according to the present disclosure.

To this end, the computing devices used to implement the servers noted elsewhere herein are therefore typically robust and computationally powerful. By employing high-performance computing platforms, such servers maximize throughput, and enable the provision of services quickly and efficiently. To this end, these server systems can be implemented using designs that are built for high-performance, in-memory operations. For example, such a server system can be designed to store multiple terabytes of data directly in memory, thereby providing for fast processing of data and communications based thereon, resulting in responsive performance that meets the timing requirements of the applicable technical standards. In one embodiment, such a server system supports high-speed main memory of 1 Terabyte (or more, depending on the element's needs) and 1.4 TB of high-speed second-tier memory (e.g., FLASH memory or the like) that can support hundreds of thousands of input/output operations per second, as well as bandwidth at the multi-gigabytes level. These memory layers are further backed by of hard disk storage (3.6 TBs or more), which is expandable (e.g., using Fibre Channel and other such high-speed technologies). Computationally, such a server system can include a processing package of 30 compute cores with hyper-threading. A generic example of such components is provided in connection with the discussion of FIGS. 13 and 14, below.

It will be appreciated that computing systems such as that described above, and the use of a datagrid (e.g., a grid-based high-availability cluster of servers) facilitates methods and systems such as those described herein. By maintaining data such as sharing group objects (discussed subsequently) in memory, fast, efficient processing of data needed to provide notification messages such as those described herein can be readily achieved.

Figure 3:
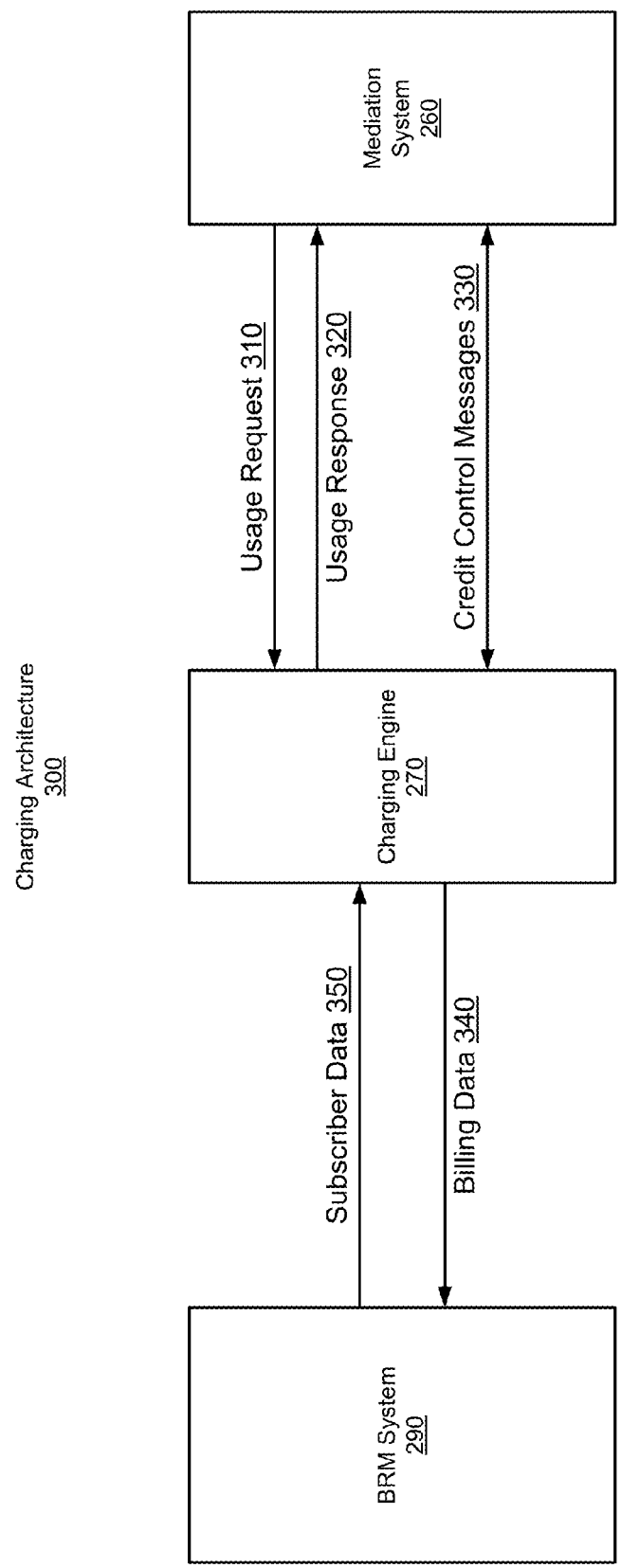
FIG. 3 is a simplified block diagram illustrating an example of a charging architecture, according to embodiments of the methods and systems disclosed herein.

FIG. 3 is a simplified block diagram illustrating an example of a charging architecture, according to embodiments of the methods and systems disclosed herein. To this end, FIG. 3 depicts a charging architecture 300 in which mediation system 260, charging engine 270, and billing and revenue management system 290 of FIG. 2 appear. In a manner comparable to that discussed briefly with regard to FIG. 2, charging engine 270 acts as a central element of charging architecture 300, as well as network architecture 200. Various of the communications between these elements are now described in connection with charging architecture 300.

In this regard, mediation system 260, having received a request from, for example, session controller 255, sends a usage request to charging engine 270 (depicted in FIG. 3 as a usage request 310). As noted elsewhere, mediation system 260 can be implemented using one or more servers, such as those described above, and can be communicatively coupled to charging engine 270 and the relevant elements of the given network architecture (e.g., session controller 255) by way of an appropriate communications protocol (e.g., one or more IP (Internet Protocol) networks that utilize a communications protocol such as Ethernet, IEEE 802.11x, or some other communications protocol). The charging request received can include, for example, a payload that contains information in the form of attributes about the subscriber's service usage, such as the type of service being utilized and service usage measurements (e.g., volume-, time-, or event-based service usage measurements). Charging engine 270 and BRM system 290 are configured to utilize the payload to charge the subscriber or perform other authorization operations.

Charging engine 270 receives usage request 310 and makes certain determinations in relation thereto, and then provides mediation system 260 with a usage response 320. For example, mediation system 260 may send a usage request 310 to charging engine 270, indicating that a subscriber has initiated a voice telephone call and requesting that charging engine 270 grant a balance reservation (e.g., an individual balance reservation or a shared balance reservation) in support of the request made on behalf of the subscriber's desired communication session.

As noted, charging engine 270 is configured to perform operations that determine (or allowed to be determined) charges that arise from a subscriber's service usage. Charging engine 270 can be implemented on one or more processing nodes, where the one or more processing nodes are implemented on one or more servers (such as on a grid-based high-availability cluster of servers, such as described earlier), and implemented on one or more computing devices. Charging engine 270 includes one or more charging components, each of which is responsible for performing a portion of the determinations needed to appropriately charge the subscriber for service usage. The charging components of charging engine 270 can be implemented on the one or more processing nodes of charging engine 270.

In turn, charging engine 270 responds with usage response 320 (e.g., granting the subscriber's communication session a balance reservation), thereby allowing the voice call to proceed. In addition, mediation system 260 and charging engine 270 may exchange credit control messages 330. Such credit control messages can include indications as to the need to terminate a session due to insufficient credit, information regarding the support of multiple services, origin- and destination-related information, and other such information. Charging engine 270 also communicates with billing and revenue management system 290, by, for example, providing billing data (depicted in FIG. 3 as billing data 340), while billing and revenue management system 290 can provide information regarding subscribers (depicted in FIG. 3 as subscriber data 350) to charging engine 270.

Figure 4:
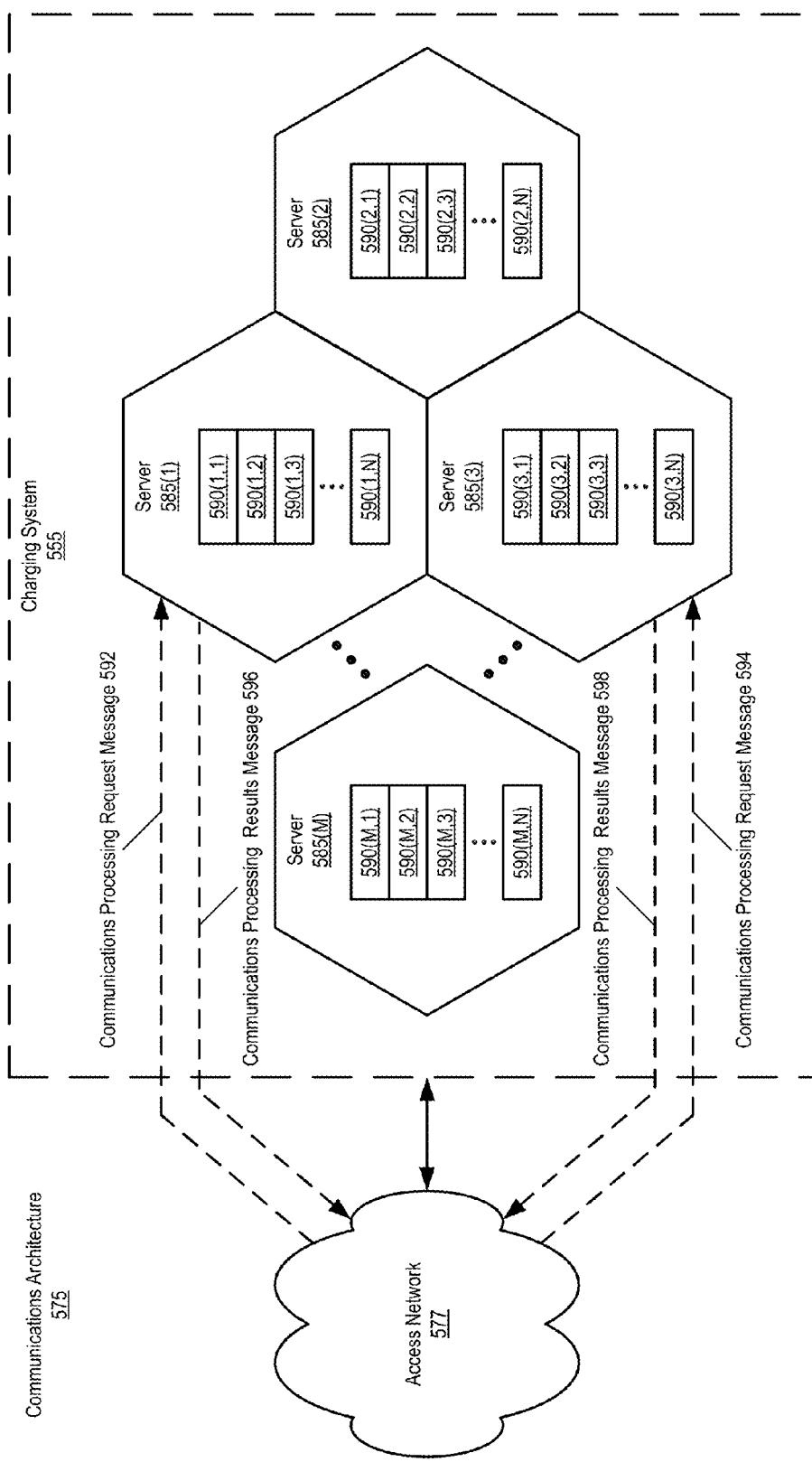
FIG. 4 is a simplified block diagram illustrating components of an example communications architecture, in which the present disclosure can be implemented, according to embodiments of the methods and systems disclosed herein.

FIG. 4 is a simplified block diagram illustrating components of an example communications architecture, in which the present disclosure can be implemented, according to one embodiment. The communications architecture illustrated in FIG. 4 (and depicted in FIG. 4 as a communications architecture 475) employs a cluster of servers, each of which is capable of performing one or more (or all) of the requisite operations needed to process communications processing request messages received and generate communications processing results therefrom. Thus, as before, communications architecture 475 includes an access network 477 and a charging system 480. In turn, charging system 480 includes a cluster of servers, which are communicatively coupled to one another to allow communication therebetween and facilitate global management thereof (depicted in FIG. 4 as servers 485(1)-(M)). As noted, each of servers 485(1)-(M) is capable of performing some or all of the operations requisite to one or more given tasks for which a given one of servers 485(1)-(M) might be assigned. In the example presented in FIG. 4, each of servers 485(1)-(M) is assigned some number of operations to perform to accomplish their assigned tasks. Thus, for example, server 485(1) performs a number of operations (depicted in FIG. 4 as operations 490(1,1)-(1,N). Servers 485(2)-(M), similarly, perform operations associated with the tasks for which servers 485(2)-(M) are responsible (depicted in FIG. 4 as operations 490(2,1)-(M,N)).

In operation, communications architecture 475, and more specifically charging system 480, receive communications processing request messages, and, after performing the processing requested by the communications processing request messages, generate communications processing results in response thereto. Such exchanges are thus depicted in FIG. 4 as charging system 480 receiving communications processing request messages 492 and 494 from access network 477, at servers 485(1) and 485(3). In response to communications processing request messages 492 and 494, servers 485(1) and 485(3) generate communications processing results messages 496 and 498, which are then sent by charging system 480 to various entities within access network 477. In contrast to the approach taken in communications architecture 450 of FIG. 4, communications architecture 475, and, more specifically, charging system 480, are able to process communications processing request messages such as communications processing request messages 492 and 494 concurrently. Thus, communications processing request message 492 might be routed to server 485(1), at which juncture operations 490(1,1)-(N,1) are performed, in order to generate communications processing results messages 496. Similarly, communications processing messages 494 can be routed to, for example, server 485(3), at which juncture the requisite operations (operations 490(1,3)-(N,3)) are performed, in order to generate charging results 498, which are then sent from charging system 480 to the appropriate entities within access network 477.

The distributed nature of communications architectures such as communications architecture 475 pose numerous technical challenges to maintaining performance, particularly as the number of subscribers grows. Even when the workload represented by a large number of subscribers is balanced across a large number of nodes (e.g., computing entities such as servers 485(1)-(N)), which can be achieved using techniques such as hashing subscriber identifiers to spread subscribers evenly among computing entities, computational demands continue to rise. Approaches such as those described herein help to address such challenges, and in so doing, provide performance that is scalable, correct, and fault-tolerant, without incurring the overhead involved in other approaches that would ultimately impede transaction processing unacceptably.

As noted, communications architectures such as communications architecture 475 can be employed in satisfying communications processing requests. Further, as noted briefly above, some combination of such architectures can be employed, depending on the application and other details of the given situation. Further, other architectures (not shown) can also be employed to good effect. While the many benefits of systems according to the present disclosure will be evident in light of the present disclosure, it should be appreciated that the more complex the architecture, the greater the benefits of the low-overhead nature of such systems.

An Example of Constructs and Operations in a Charging Environment

Figure 5:
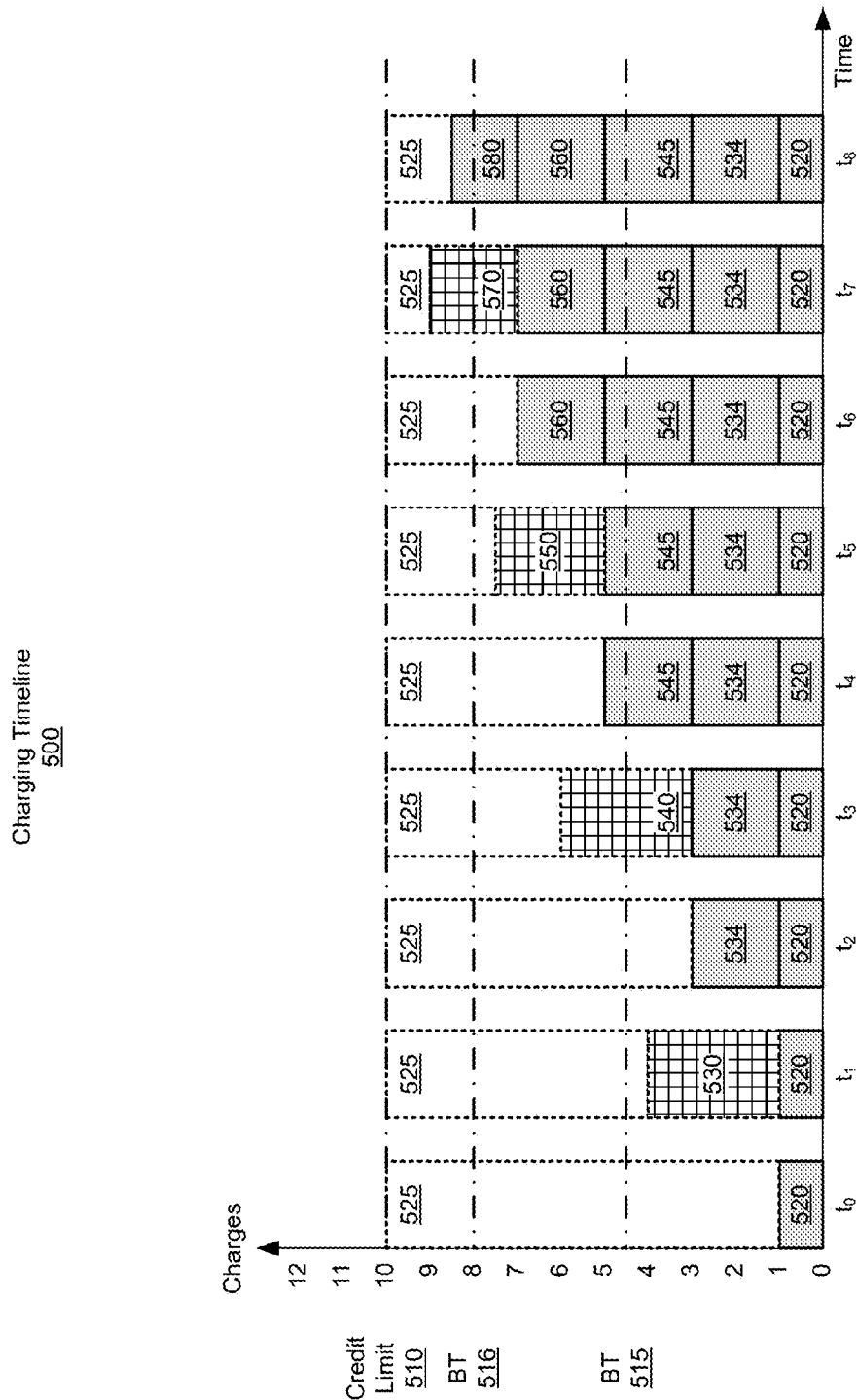
FIG. 5 is a simplified block diagram illustrating an example of a charging timeline.

FIG. 5 is a simplified block diagram illustrating an example of a charging timeline 500, which illustrates the manner in which the methods and systems disclosed herein can be employed to address situations that can arise when implementing sharing groups, and demonstrates the manner in which such methods and systems address such situations. Charging timeline 500 illustrates certain of the problems that can be encountered by charging systems. As can be seen in FIG. 5, a simplified version of such situations (and depicted thusly for purposes of clarity), time proceeds from a time $t_0$ through $t_8$ (and beyond) on an X-axis of charging timeline 500, while charges range from zero to twelve (and beyond) on a Y-axis of charging timeline 500. Also depicted in FIG. 5 is a credit limit 510, which, in the present example, indicates a maximum amount of charges allowable for the given subscriber account. In this regard, a subscriber may elect to set one or more balance thresholds (examples, of which are depicted in FIG. 5 as balance thresholds 515 and 516), and in so doing, request that a notification be sent, indicating that the subscriber's current balance has exceeded such a threshold. As noted, satisfying such a request is problematic in the case of a shared balance, as notifying the sharing group members is problematic.

In the scenario depicted in FIG. 5, the amounts for a shared balance over time are illustrated. The shared balance begins with an opening balance (depicted in FIG. 5 as a committed balance 520) and an available balance (depicted in FIG. 5 as an available balance 525). As can be seen in FIG. 5, available balance 525 is the amount of credit available in the subscriber's account, up to the account's credit limit (depicted in FIG. 5 as credit limit 510). Viewed another way, committed balance 520 and available balance 525, taken together, aggregate to credit limit 510 (as is depicted in the example in FIG. 5 at time $t_0$). In the manner noted earlier, credit limit 510 can be a hard credit limit (e.g., allowing usage only up to an amount deposited with a service provider, an amount the service provider is willing to authorize in advance, some limited amount of free usage, or the like), and can include dollar amounts, free cellular telephone minutes, pre-paid voice/data services, some number of text messages, a given amount of data, and/or the like, either taken alone or in combination.

At a time subsequent to time $t_0$, the subscriber initiates a communications session (e.g., by initiating a voice call using a cell phone). Thus (e.g., at a time $t_1$), the charging system receives an indication of this event, and begins its accounting for such service. In response, the charging system reserves a balance reservation in a given amount (e.g., an amount indicated in the usage request), which is depicted in FIG. 5 as balance reservation 530, and sends a reply (also referred to herein as a usage response), in the present example, indicating that the requested balance reservation has been reserved and that the request has been granted. It is at this time that the charging system performs certain accounting operations related to balance reservation 530, such as checking whether usage has exceeded or may exceed one of balance thresholds 515 and 516 (here, not the case).

The communications session (voice call) proceeds until a subsequent time, at which point the communications session ends, and the portion of the balance reservation (balance reservation 530) actually used in the communications session, is committed. Such a situation is depicted in FIG. 5 at a time $t_2$, at which point the portion of balance reservation 530 that has actually been used is accounted for (depicted in FIG. 5 at committed balance 534). The unused portion of balance reservation 530 is returned to available balance 525.

At some time subsequent to time $t_2$, the same or another subscriber in the sharing group may initiate another communications session (another voice call, in this example), at which point the charging system begins accounting for this new communications session. At this juncture, the charging engine receives an authorization request, and as before, reserves the requested amount and grants the request (depicted in FIG. 5 as occurring at a time $t_3$). In so doing, the charging engine reserves a balance reservation 540. The charging system again performs certain accounting operations, this time with respect to balance reservation 540, such as checking whether usage has exceeded or may exceed one of balance thresholds 515 and 516. At this point (time $t_3$), the shared balance consumed exceeds balance threshold 515. This event results in the active subscriber (the subscriber whose communications sessions resulted in the exceeding of balance threshold 515) being sent, and receiving, a notification indicating that balance threshold 515 has been exceeded as a result of the reservation of balance reservation 540. At this juncture, according to methods and systems such as those described herein, one or more other sharing group members also receive such notification. Without such notification, such sharing group members would be unaware of balance threshold 515 having been exceeded, and would otherwise be unable to proceed accordingly.

The communications session (voice call) proceeds until a subsequent time, at which point the communications session ends, and the portion of the balance reservation (balance reservation 540) actually used in the communications session, is committed. Such a situation is depicted in FIG. 5 at a time $t_4$, at which point the portion of balance reservation 540 that has actually been used is accounted for (depicted in FIG. 5 at committed balance 545). The unused portion of balance reservation 540 is returned to available balance 525.

In a situation without techniques such as those described herein, in the manner noted above, the active subscriber breaching the first shared balance threshold (balance threshold 515) receives a notification thereof, while other subscribers in the sharing group are not made aware of the situation, and so, do not know that the first shared balance threshold (balance threshold 515) has been breached (as they did not receive any notification). Subsequently, such subscribers may consume a certain amount of the shared balance, and never receive any indication that their usage is beyond the first shared balance threshold (balance threshold 515), having not receive any indication thereof, nor any further notification of the amount of shared balance consumed to that point (no further threshold having been breached). After that subscriber's usage, yet another subscriber in the sharing group may attempt to make a balance reservation against the shared balance, and, as a result of the prior (and un-notified) usage, immediately receive a notification that the second shared balance threshold (balance threshold 516) has been breached, having not received any indication of the state of the shared balance. Such a case is now described with regard to charging timeline 500.

Thus, at a point in time subsequent to time $t_4$ (depicted in FIG. 5, e.g., as a time $t_5$), another subscriber in the sharing group initiates another communications session (another voice call, in this example), at which point the charging system begins accounting for this new communications session. At this juncture, the charging engine receives another authorization request, and as before, reserves the requested amount and grants the request. In so doing, the charging engine reserves a balance reservation 550. The charging system again performs certain accounting operations, this time with respect to balance reservation 550, such as checking whether usage has exceeded or may exceed balance threshold 516 (balance threshold 515 having already been exceeded). At this point (time $t_5$), the shared balance consumed does not breach balance threshold 516, so no notifications are sent. It will be appreciated in light of the present disclosure that, without benefit of techniques such as those described herein, the active subscriber at this juncture will not be aware that balance threshold 515 has been exceeded, and that, in fact, there is risk that balance threshold 516 will be exceeded, should the communications session continue. Further, the original active subscriber (who may well not be the subscriber presently active) would also not receive a notification in the case of another active subscriber breaching balance threshold 516, save for methods and systems such as those described herein.

Such is not the case in the example presented in FIG. 5, as this most recent communications session (voice call) ends, having proceeded to that point without the need to reserve further shared balance. The portion of the balance reservation (balance reservation 540) actually used in the communications session is committed. Such a situation is depicted in FIG. 5 at a time $t_6$, at which point the portion of balance reservation 550 that has actually been used is accounted for (depicted in FIG. 5 at committed balance 560). The unused portion of balance reservation 550 is returned to available balance 525.

As will be appreciated, the total committed balance of the shared balance is now close to balance threshold 516. In the scenario presented in FIG. 5, yet another subscriber in the sharing group initiates yet another communications session (another voice call, in this example) at some later time (depicted, e.g., in FIG. 5 as a time $t_7$), at which point the charging system begins the process of accounting for this new communications session. At this juncture, the charging engine receives another authorization request, and as before, reserves the requested amount and grants the request. In so doing, the charging engine reserves a balance reservation 570. The charging system again performs certain accounting operations, this time with respect to balance reservation 570, such as checking whether usage has exceeded or may exceed balance threshold 516. At this point (time $t_7$), the shared balance consumed exceeds balance threshold 516. This event results in the now-active subscriber (the subscriber whose communications session resulted in the exceeding of balance threshold 516) being sent a notification indicating that balance threshold 516 has been exceeded as a result of the reservation of balance reservation 570. Without methods and systems such as those described herein, the exceeding of balance threshold 516 comes as a surprise to the now-active subscriber, that subscriber having never even received an indication of balance threshold 515 having been exceeded. Clearly, without the functionality provided by methods and systems such as those described herein, the members of a sharing group are risk for untoward surprises in their service usage. As will be appreciated, such incidents result in a degraded user experience.

In any event, as before (and as depicted in FIG. 5), the communications session (voice call) proceeds until a subsequent time, at which point the communications session ends, and the portion of the balance reservation (balance reservation 570) actually used in the communications session, is committed. Such a situation is depicted in FIG. 5 at a time $t_8$, at which point the portion of balance reservation 570 that has actually been used is accounted for (depicted in FIG. 5 at committed balance 580). The unused portion of balance reservation 570 is returned to available balance 525. It will be appreciated in light of the present disclosure, and as is described elsewhere herein, it is also possible to control the recipients of such notifications, on a balance threshold-by-balance threshold basis (e.g., sending notifications to specific subsets of the affected sharing group members based, for example, on which balance threshold is breached). In such a scenario, the breach of balance threshold 515 might result in notifications to only certain members of the affected sharing group, while the breach of balance threshold 516 might result in notifications to all members of the affected sharing group. As will be appreciated in light of the present disclosure, various alternatives exist in this regard, and are intended to come within the scope of the present disclosure.

Figure 6:
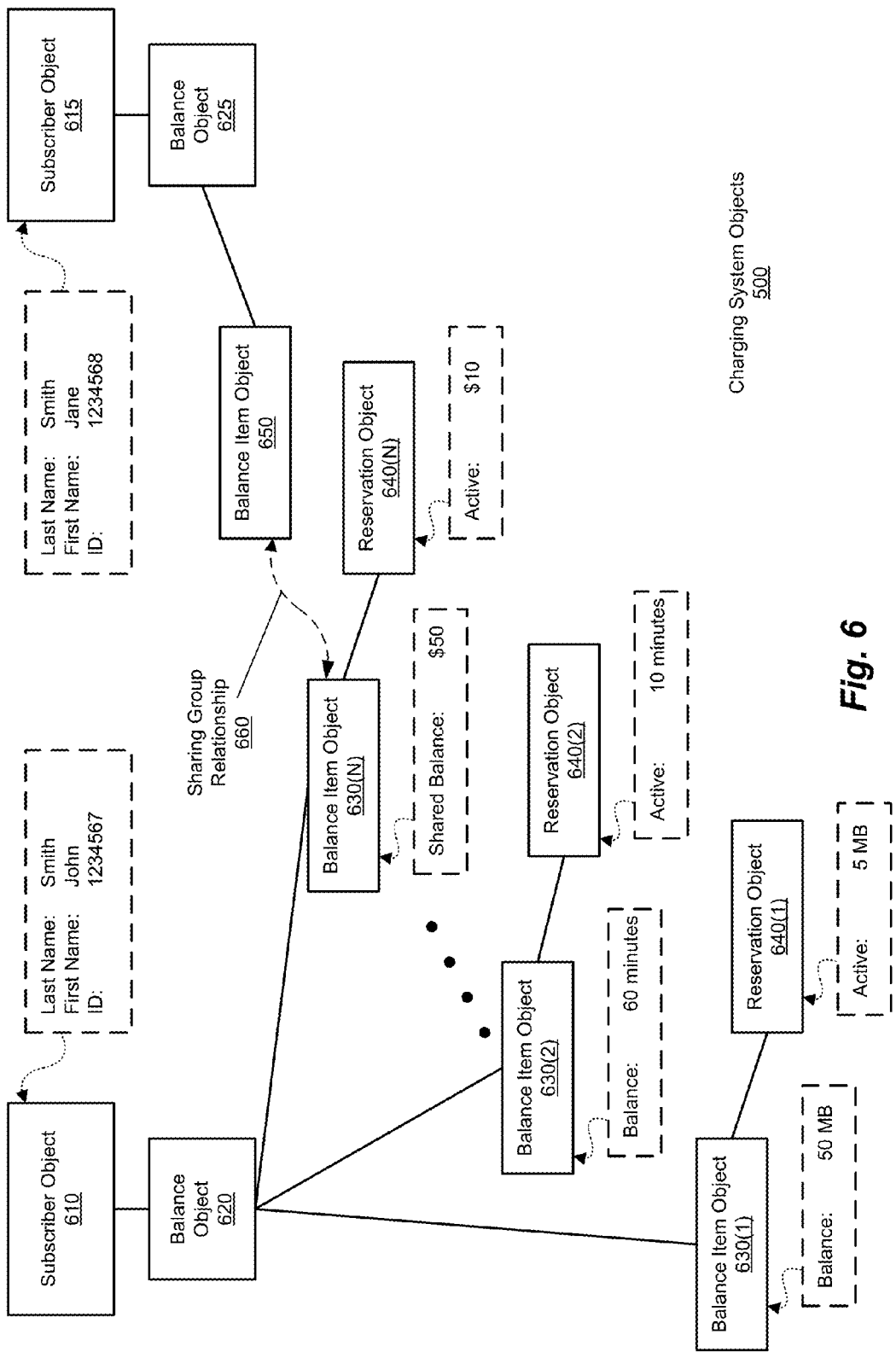
FIG. 6 is a simplified block diagram illustrating an example of charging system objects, according to embodiments of the methods and systems disclosed herein.

FIG. 6 is a simplified block diagram illustrating an example of charging system objects, according to embodiments of the methods and systems disclosed herein. FIG. 6 thus depicts a number of charging system objects (depicted in FIG. 6 as charging system objects 600), which provide examples of the structures in which balance information according to the methods and systems disclosed herein can be stored and processed. That being the case, charging system objects 600 include subscriber objects 610 and 615. Subscriber object 610 has one or more child objects (e.g., depicted in FIG. 6 as a balance object 620). Similarly, subscriber object 615 also has one or more child objects (e.g., depicted in FIG. 6 as a balance object 625).

Subscriber objects 610 and 615 maintain information regarding their respective subscribers, which can include, for example, a last name, a first name, and an identification number (examples of which are depicted in FIG. 6). Subscriber information maintained in subscriber objects 610 and 651 can, for example, include information such as the subscriber information obtained in the processes elsewhere herein, as relate to the creation and maintenance of subscriber accounts, including the sharing described herein. Balance object 620 has child objects, for example, which include a number of balance item objects (depicted in FIG. 6 as balance item objects 630(1)-(N)). In turn, balance item objects 630(1)-(N) have as child objects one or more reservation objects (depicted in FIG. 6 as reservation objects 640(1)-(N). As can be seen in FIG. 6, balance item objects 630(1)-(N) maintain information regarding a subscriber's balances for a given type of service (e.g., balance item object 630(1) maintains information regarding a data balance (here, 50 MB); balance item object 630(2) maintains information regarding remaining minutes for voice telephone calls (here, 60 minutes); and balance item object 630(N) maintains information regarding a dollar value balance for another service (or for use in the subscriber's data or voice sessions (here, $50)). Similarly, reservation objects 640(1)-(N) maintain information regarding a given communications session using a corresponding service, and indicate the amount of balance presently reserved. Such information can be used in the processes described earlier, for example. In comparable fashion, balance object 625 also has child objects, for example, which include a number of balance item objects (an example of which is depicted in FIG. 6 as a balance item object 650).

As can be seen in FIG. 6, balance item objects 630(N) and 650 are associated with one another by way of a sharing group relationship 660. It will be appreciated that sharing group relationship 660 is merely a representation of a sharing group balance, and that information regarding the sharing relationship between the balances of the subscribers represented by subscriber objects 610 and 615 can be maintained, for example, in a sharing group balance object or other such construct, as well as the existence of and subscriber information for one or more subscribers in the sharing group, in a sharing group object (as maintained, e.g., by a charging engine or other such system). Thus, while the shared balance in FIG. 6 is illustrated as being maintained in both balance item objects 630(N) and 650, such shared balance information can be maintained in a sharing group balance object (or other construct), in one or the other of balance item objects 630(N) and 650, or in another construct as may be deemed advantageous in the design of charging systems such as those described herein. It will be appreciated that, as depicted in FIG. 6, the subscriber represented by subscriber object 610 is the active subscriber (e.g., as observed in connection with charging timeline 500 of FIG. 5), which is reflected by reservation object 640(N) reflecting an active balance reservation of $10 (which is reserved against the shared balance that is shared between the subscribers represented by subscriber objects 610 and 615).

Further, the structure of charging system objects 600 lends itself to facilitating processes such as those described herein. An architecture such as charging system objects 600 offers, for example, a runtime model that provides fine-grained control over and tracking of information through the use of domain entities. The persistence model such a construct offers also provides for coarse-grained control over characteristics that may apply to a number thereof, or to others. Benefits include the efficient storage of and access to such information, and compact representation of such information in the memory and storage systems of charging systems such as those described herein.

With regard to the elements of FIG. 6, the subscriber, as indicated in relation to subscriber object 610, is one John Smith with a subscriber identifier of 1234567 (which can be, for example, a telephone number, of the form (area_code) 123-4567). Subscriber John Smith's balance, as depicted in relation to balance item object 630(N), is currently $50, with an active balance reservation of $10 and a consumed balance reservation of $15 (as indicated in relation to reservation object 640(N)). Further, subscriber John Smith has a "free minute" balance of 60 minutes, with an active balance reservation of 10 minutes and a consumed balance reservation of 25 minutes (in relation to balance item object 630(2) and reservation object 640(2), respectively). In a similar fashion, subscriber John Smith has a data balance of 60 MB, with an active balance reservation of 6 MB and a consumed balance reservation of 15 MB (in relation to balance item object 630(1) and reservation object 640(1), respectively). Comparable information can thus be maintained for Jane Smith (represented by subscriber object 615). It will be noted that, for John Smith, only the balance represented by balance item object 630(N) is shared—balance item objects 630(1)-(N−1) are individual balances. To this end, John Smith is free to use the balances indicated in balance item objects 630(1)-(N−1) without regard to any sharing relationship. It will be further appreciated that a given subscriber's account can be configured with any number of individual (non-shared) and shared balances, in any combination and to any level of complexity. Such scenarios are intended to come within the scope of this disclosure, and as such, will enjoy the benefits of methods and systems such as those described herein.

Figure 7:
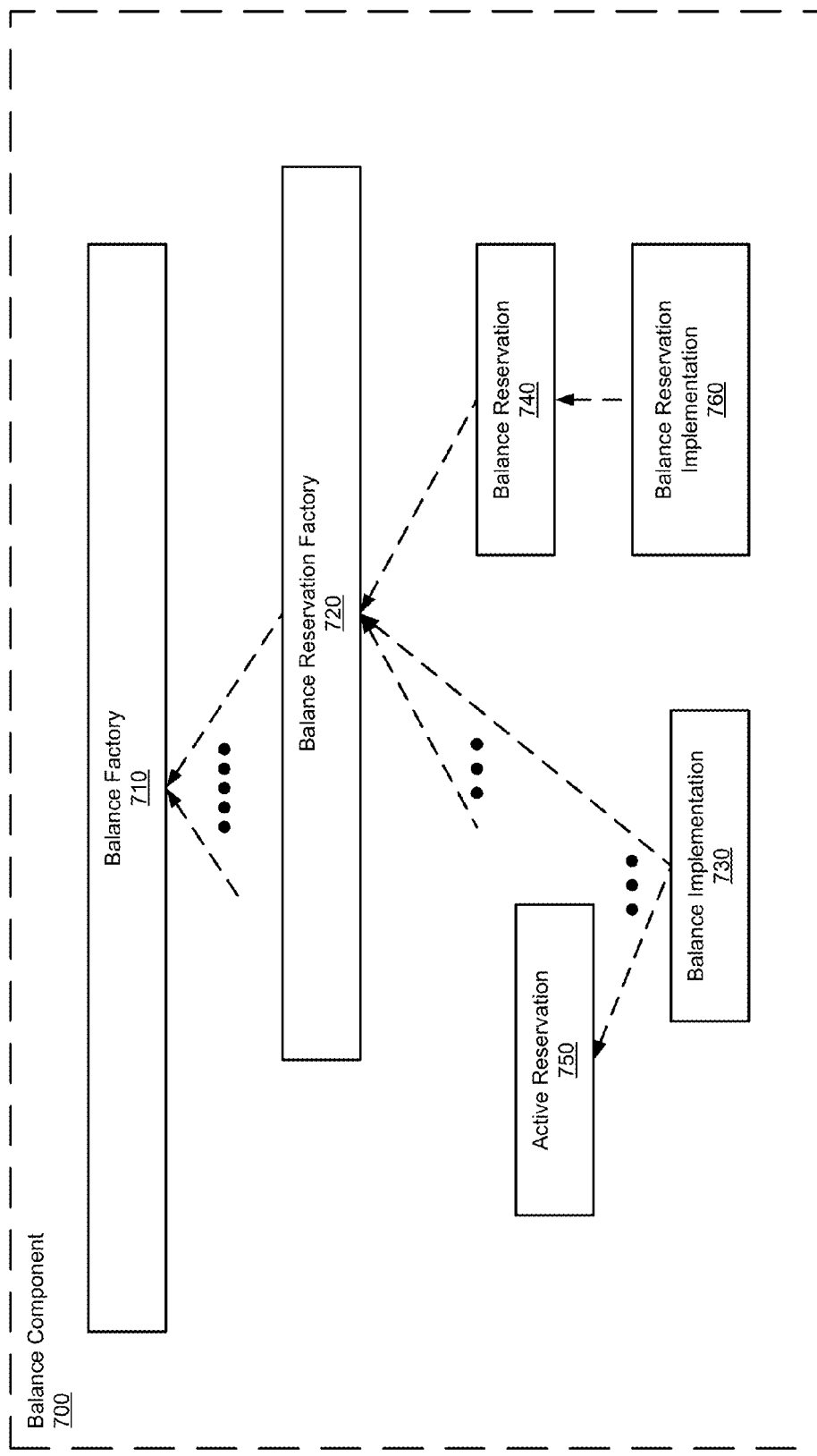
FIG. 7 is a simplified block diagram illustrating an example of a balance component, according to embodiments of the methods and systems disclosed herein.

FIG. 7 is a simplified block diagram illustrating an example of a balance component, according to embodiments of the methods and systems disclosed herein. From an object oriented programming perspective, the aforementioned objects can be implemented in a manner such as that depicted in FIGS. 7 and 16. For example, a balance component 700 is depicted in FIG. 7, and illustrates the relationships between certain of the structures and the methods that employ them. That being the case, balance component 700 includes a balance factory 710, which, in turn, includes a balance reservation factory 720. Balance reservation factory 720, in turn, employs one or more balance implementations 730 and a balance reservation 740. In the manner depicted in FIG. 14, balance implementation 730 has associated with it an active reservation 750. Similarly, balance reservation 740 has associated with it a balance reservation implementation 760. Through these constructs, charging system objects such as charging system objects 600 can be created and maintained.

Figure 8:
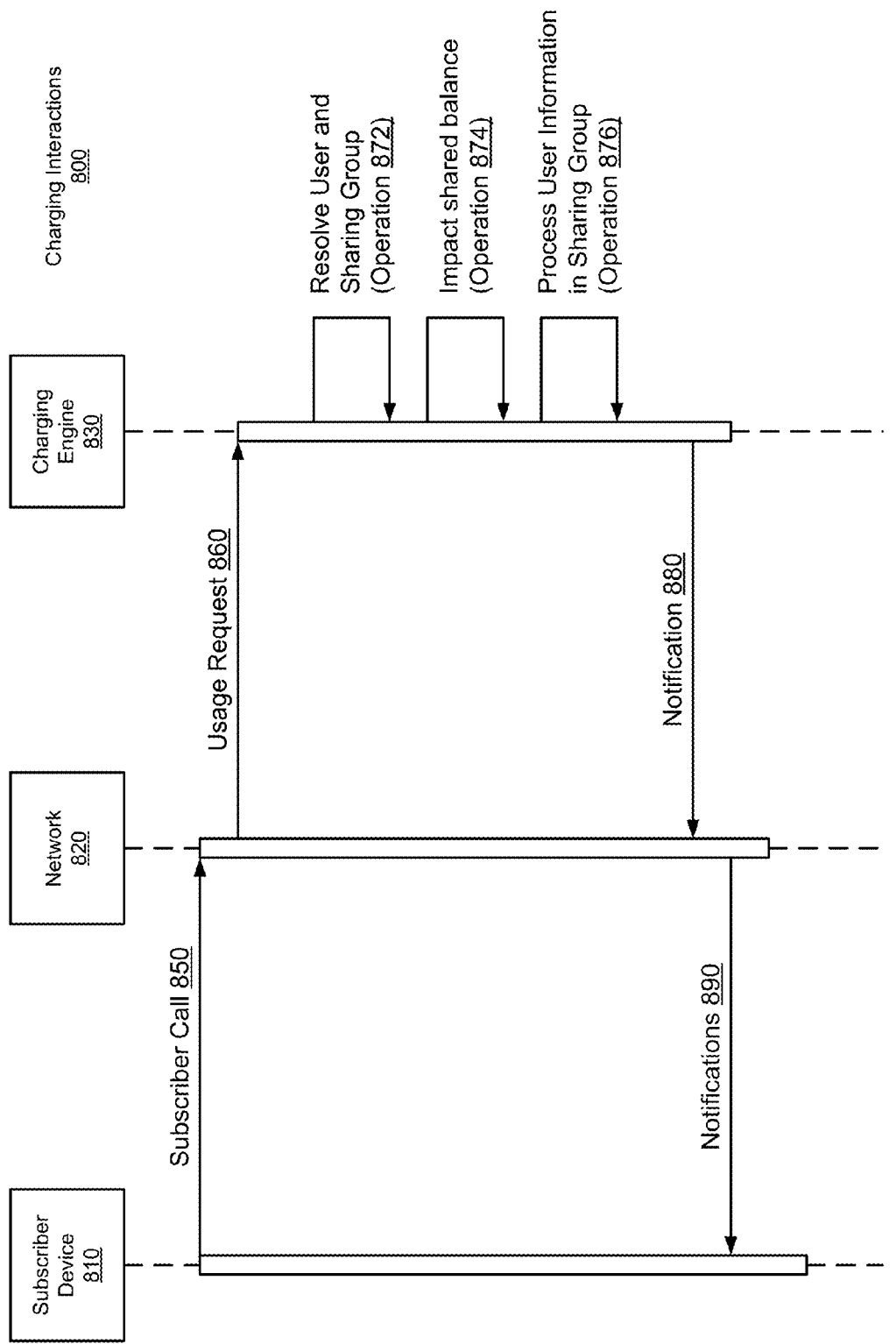
FIG. 8 is a simplified transaction sequence diagram illustrating an example of a sharing group notification transaction sequence, according to embodiments of the methods and systems disclosed herein.

FIG. 8 is a simplified transaction sequence diagram illustrating an example of a sharing group notification transaction sequence, according to embodiments of the methods and systems disclosed herein. Many examples of scenarios exist that benefit from methods and systems such as those disclosed herein. For example, a family of four might have a "shared" (combined) pool of 100 GB of data download, a limit after which bandwidth will be throttled (or additional cost incurred). When usage by the members of the sharing group (family members) reaches 90 GB, a notification needs to be sent to users warning them that the users are edging toward the 100 GB limit. Heretofore, when such a threshold was breached (e.g., reached or exceeded), such a notification was only sent to the user whose data session caused the threshold breach, and not to other sharing group members (members of family). Methods and systems such as those disclosed herein provide for the generation of notifications to the sharing group members (family members) with significantly less overhead on the request processing performed.

In another example, the employees of a corporation might have a "shared" pool of 1000 free minutes of talk-time (e.g., by way of cellular telephone), after which individual employees are charged standard rates for their cellular telephone calls. That being the case, it is clearly important for the employees to receive a notification before that limit is reached (e.g., when the total usage reaches 900 free minutes). Using methods and systems such as those disclosed herein, a notification is sent to the employees, informing them that the threshold has been breached, and should such use continue unabated, they will begin to accrue charges individually. With reference to FIG. 6, such a situation would result in a shift from charges being accrued against balance item object 630(N) (a shared balance) to balance item object 630(N−1) (an individual balance), given that balance item object 630(N), at that point, would reflect no remaining free minutes (such free minutes having been consumed by the sharing group members (the employees of the corporation)).

The simplified transaction sequence diagram of FIG. 8 thus illustrates a number of charging interactions (depicted in FIG. 8 as charging interactions 800) that can be performed in an embodiment that provides the aforementioned advantages. The entities involved in charging interactions 800 include, generally, a subscriber device 810, a network 820, and a charging engine 830. With reference to FIGS. 1-4, examples of subscriber device 810 include clients 125(1)-(N), mobile devices 140, SMS client 160, and the like; examples of network 820 include communications network 110, switching subsystem 215(1) and mediation system 260, access network 577, and the like; and examples of charging engine 830 include charging engine 182, charging engine 270, charging system 555, and the like.

In operation, the architecture of FIG. 8 conducts the following operations to effect charging interactions 800. The process begins with a request being made by a member of a sharing group (i.e., a sharing group member). For example, a subscriber (e.g., the sharing group member) placing a cellular telephone call, for example (depicted in FIG. 8 as a subscriber call 850). Network 820 (e.g., at a switching subsystem and, subsequently, a mediation system) receives the request to make the cellular telephone call from the subscriber, then generates and submits (sends) a usage request (depicted in FIG. 8 as a usage request 860) on behalf of the subscriber making the request (in this case, the subscriber placing the cellular telephone call) to charging engine 830, which receives the usage request and begins processing thereof. In some embodiments, the usage request includes information that identifies the subscriber on behalf of whom the usage request is made.

Having received usage request 860, charging engine 830 performs a number of charging engine operations. First, charging engine 830 resolves the subscriber making the usage request, as well as any sharing group(s) that may be involved in the transaction, thereby producing subscriber information regarding the subscriber and sharing group information regarding the sharing group (charging engine operation 872, the latter of which can employ the subscriber information produced by resolving the subscriber). As noted, for any given subscriber and service, the balance in question may be an individual balance or a shared balance, and, as noted, transitions between one balance (individual or shared) and another balance (individual or shared) can occur. Next, assuming that the balance in question is a shared balance, charging engine 830 determines the impact on the shared balance (charging engine operation 874, which impacts the shared balance(s) affected by the transaction being processed). In certain embodiments, this charging engine operation impacts the shared balance(s) (e.g., performs the accounting operations necessary to, for example, reserve (or consume directly, depending on the situation at hand) a given amount of balance), and makes a determination as to whether such operation(s) have resulted in one or more shared balance threshold(s) being breached. As noted below, such shared balance threshold(s) can be designed in a manner such that any grouping of members of the sharing group can receive notification of the breach of any given shared balance threshold, as may be desired. For example, a first shared balance threshold might be set (by designed or configuration) such that only the given subscriber (e.g., a child of the account holder (the child's parent)) is notified, while the breach of a subsequent (e.g., higher) shared balance threshold might result in the notification of the subscriber (e.g., the child) and another sharing group member (e.g., a parent of the child), while the breach of yet another shared balance threshold might result in the notification of the subscriber (e.g., a child) and all other sharing group members (e.g., a sibling and both of the child's parents). As will be appreciated in light of the present disclosure, such an approach can serve as a valuable tool for sharing group members in such situations.

In so doing, charging engine 830 may determine that a threshold breach has occurred, and if so, charging engine 830 can prepare one or more notification message(s), to be used in notifying the (affected) sharing group members. Such charging engine operations can include, for example, processing subscriber information in, for example, a sharing group object (charging engine operation 876), in order to produce the requisite subscriber identification information. The subscriber identification information thus obtained is can then be included in the notification message(s) thus generated.

As noted elsewhere herein, such processing can include decompression of subscriber information in a sharing group object, for provision to a mediation system in a notification message, for example. As will be appreciated in light of the present disclosure, the ability to maintain sharing group objects in memory facilitates fast, efficient processing thereof. By compressing what is potentially a large amount of information in such sharing group objects, the memory consumed thereby is significantly reduced, allowing a greater number of such sharing group objects to be maintained in charging engine memory, providing support for a larger number our sharing groups, and so, subscribers belonging thereto. As will be appreciated in light of the present disclosure, an advantage of maintaining such information in memory is the elimination of latency due to input/output operations from/to data storage systems (e.g., fixed media storage units such as hard disks and the like), particularly where subscribers would otherwise have to be accessed individually.

Further in this regard, it will be appreciated that the need for such notifications is typically infrequent, and so the need for decompression of the sharing group member information is similarly infrequent. In this vein, it will be appreciated that the concept of temporal locality can be used to good effect in such situations, given that once one threshold is breached, if there are further thresholds, such further thresholds may well also be at risk for being breached (e.g., for a limit of 100 MB with thresholds of 80 MB and 90 MB, once the 80 MB threshold has been breached, the 90 MB threshold is clearly at greater risk of being breached). In such situations, it may be advantageous to maintain the (uncompressed) sharing group member information, in the event that such information will be needed once again relatively soon, in order to notify one or more of the subscribers whose information is (now) already available.

Having performed the aforementioned charging engine operations (and so determined the need for sharing group members to be notified and identifying those sharing group members), charging engine 830 sends a notification message (depicted in FIG. 8 as a notification 880) to network 820. It will be appreciated, in light of the present disclosure, that the notification message can include member identification information for all the members to be notified, or some subset thereof. In the latter case, the members identified in the member identification information may simply represent a subset of those members to be notified, or may represent such a subset of the members as can be defined by a "notification group." Such a notification group can represent only those members who are to receive a notification upon the breach of a shared balance threshold (any of the thresholds defined for the sharing group). Alternatively, such a notification group can be defined for one or more specific shared balances. For example, the first such threshold breached results in a notification only to the subscriber requesting service, the next threshold breached results in a notification to a subset of the sharing group members, and another results in notification to a larger subset of the sharing group members, until some point at which all sharing group members receive a notification. As will be appreciated in light of the present disclosure, any number of combinations of the aforementioned features can be envisioned, and are intended to come within the scope of the present disclosure.

Notification 880 is received, for example, at a mediation system, which, using such a message, determines the sharing group members who are to be notified, and generates the requisite notifications. Thus, notification 880, while a single notification (or, in other embodiments, a smaller number of notifications than would otherwise be possible), includes information that identifies the sharing group members who are to be notified of the event given rise to the notification, and so facilitates the creation and communication of notifications to one or more members of the sharing group other than the sharing group member whose request resulted in the notification. Such operations are depicted in FIG. 8 by notifications 890 (among which is a notification to subscriber device 810), which network 820 then communicates notifications to the (affected) sharing group members.

As noted, information regarding sharing group members can be kept in a compressed format in a sharing group object in the charging engine. In a case in which a notification needs to be sent to one or more members of the sharing group, the sharing group member information (having been compressed) is decompressed. This might be the case in the event of a threshold breach on a shared resource being detected, but can, in fact, be used in any situation in which a notification is to be sent to one or more of the sharing group's members (whether or not such notification is the result of the detection of a threshold breach on a shared resource that necessitates a separate notification to individual sharing group members). Thus, instead of generating a separate notification to each individual member, only a single notification need be sent to the mediation server (or other such entity) by the charging engine. This single notification includes information regarding the sharing group members who are to receive the notification. Such an approach significantly reduces the traffic between charging engine and mediation server.

Figure 9:
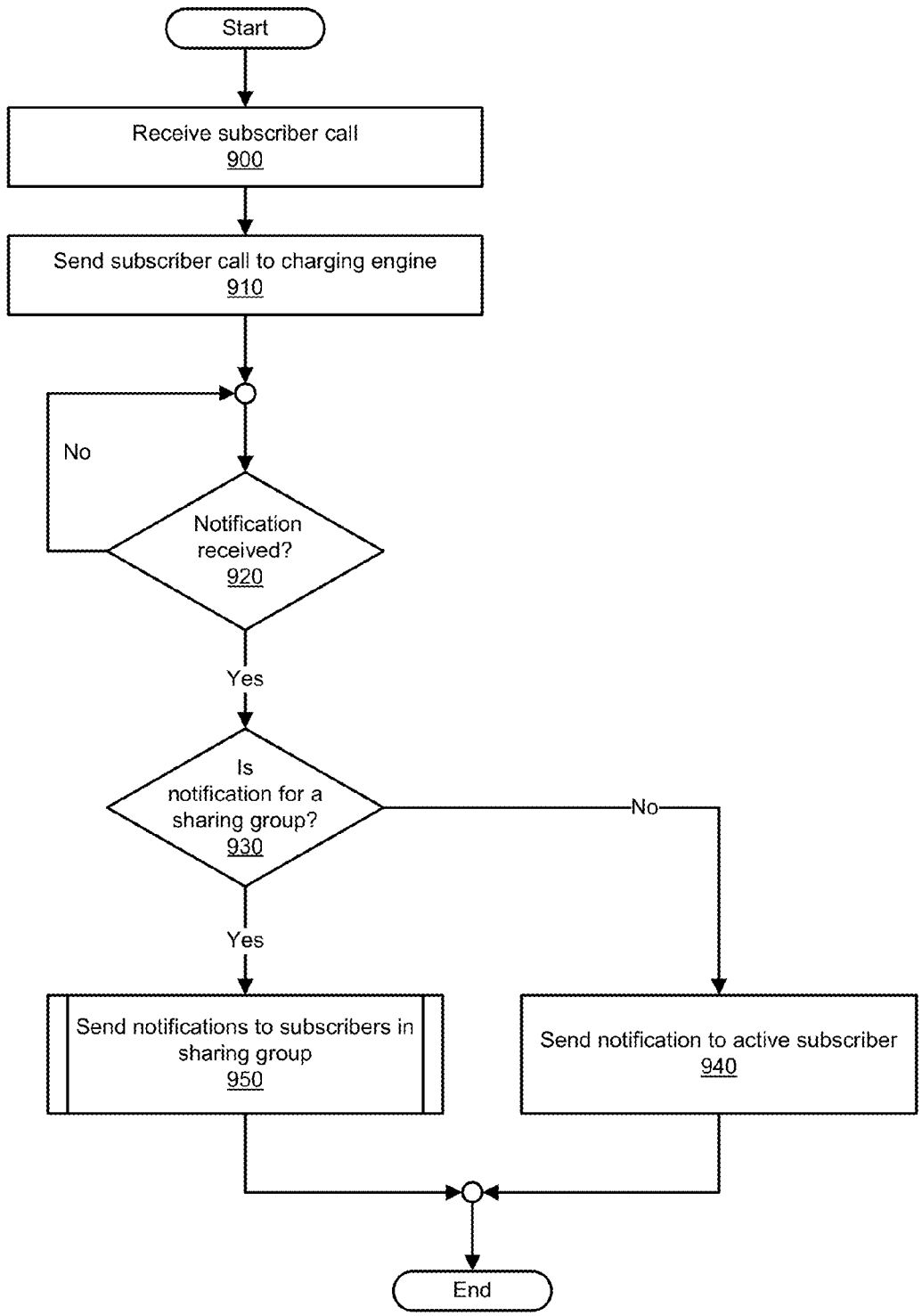
FIG. 9 is a simplified flow diagram illustrating an example of the operations performed when processing a portion of a sharing group notification sequence, according to embodiments of the methods and systems disclosed herein.

FIG. 9 is a simplified flow diagram illustrating an example of the operations performed when processing a sharing group notification transaction sequence (such as that depicted in FIG. 8, from the perspective of network 820), according to embodiments of the methods and systems disclosed herein. The process of FIG. 9 begins with the receipt of a subscriber call (e.g., subscriber call 850) by a network (e.g., network 820) (900). Next, the network sends the subscriber call to a charging engine (e.g., charging engine 830). A determination is then made (e.g., by a mediation system) as to whether a notification has been received from the charging engine (920). As will be appreciated in light of the present disclosure, the mediation system can await the receipt of a notification, but at some point (or in response to a message from the charging engine to this effect), the mediation system can assumed that no notification will be forthcoming.

If a notification is received by the mediation system, a determination is made as to whether the notification for a sharing group (930). If the notification received is not for a sharing group (i.e., the notification is for an individual subscriber), the mediation system, via the network, sends a notification to the active subscriber (940). However, if the notification received is for a sharing group, the mediation system performs operations that results in the sending of notifications to one or more subscribers in the sharing group (950). A process in which notifications are sent to one or more subscribers in the sharing group is discussed in greater detail in connection with FIG. 10. The process then concludes.

Figure 10:
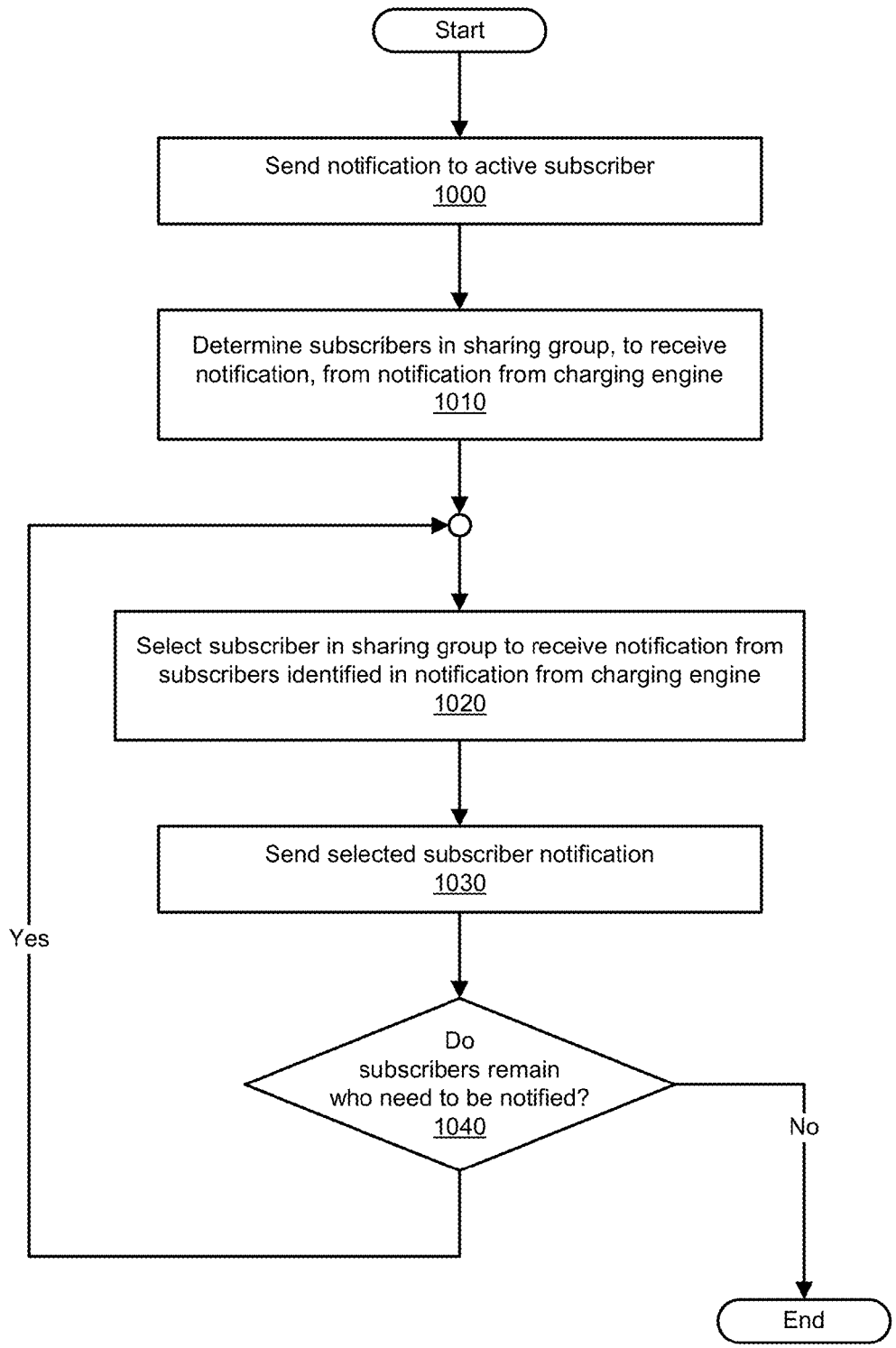
FIG. 10 is a simplified flow diagram illustrating an example of the operations performed when processing a portion of a sharing group notification sequence, according to embodiments of the methods and systems disclosed herein.

FIG. 10 is a simplified flow diagram illustrating an example of the operations performed when processing a sharing group transaction sequence, according to embodiments of the methods and systems disclosed herein. The process of sending notifications to subscribers in sharing group, as depicted in FIG. 10, begins with sending a notification to the active subscriber, whose usage request has given rise to the notification being sent (1000). Next, the process of FIG. 10 makes a determination as to the subscribers in sharing group, who are to receive notification, using information in the notification message received from the charging engine (1010). One of the subscriber in sharing group, who is to receive the notification, is then selected from subscribers identified in the notification message received from charging engine (1020). The subscriber thus selected is sent a notification (1030), which can include, for example, information identifying the sharing group, the service in question, the threshold involved, and, possibly, other information useful to the selected subscriber. A determination as to whether further subscribers, who need to be notified, remain (1040). If further subscribers need to be notified, the process iterates, selecting the next subscriber to receive the notification (1020 and 1030). Otherwise, the requisite notifications having been sent to the sharing group subscribers who are to receive the notification, the process concludes.

Figure 11:
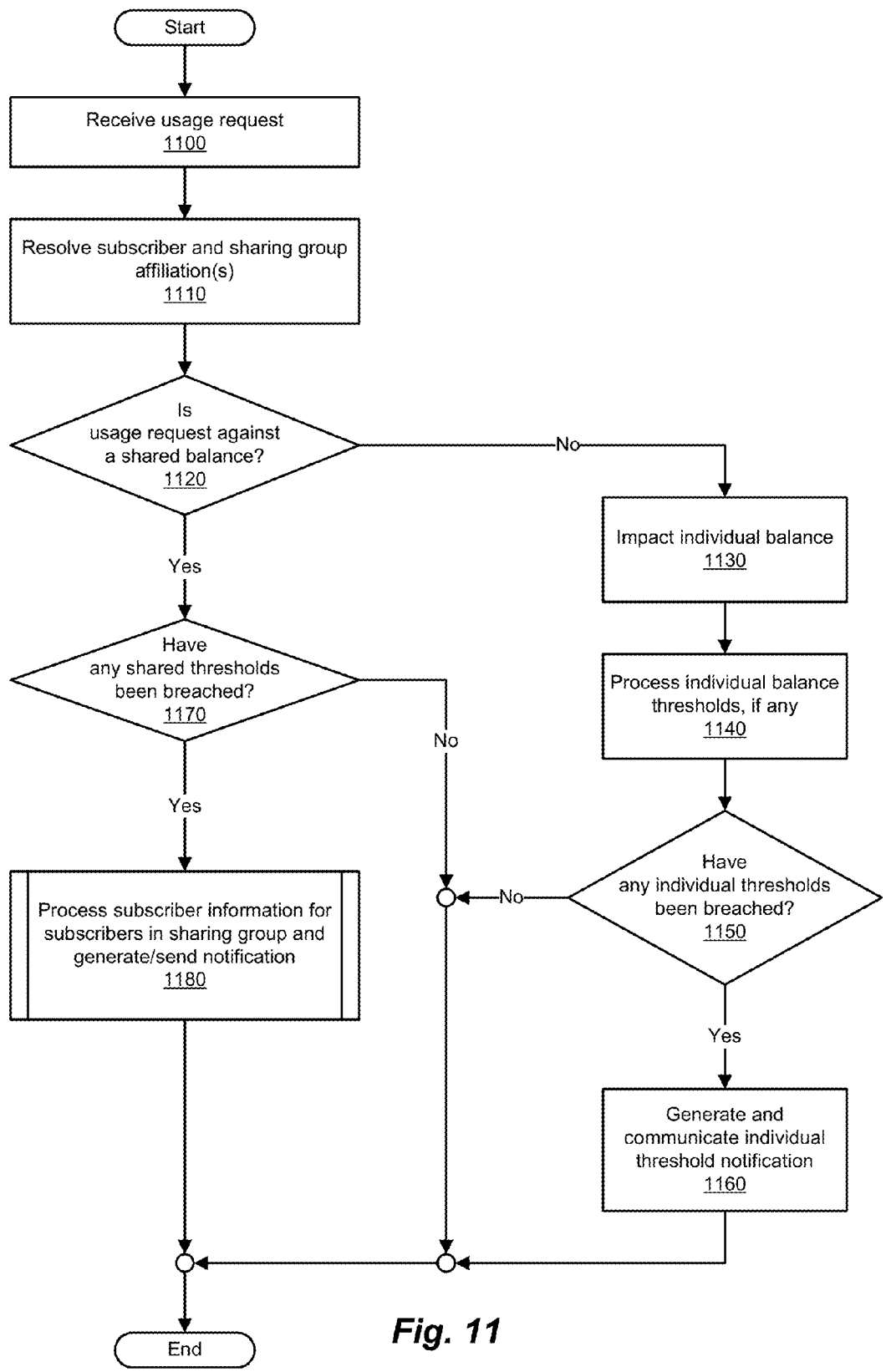
FIG. 11 is a simplified flow diagram illustrating an example of the operations performed when processing a portion of a sharing group notification sequence, according to embodiments of the methods and systems disclosed herein.

FIG. 11 is a simplified flow diagram illustrating an example of the operations performed when processing a sharing group transaction sequence, according to embodiments of the methods and systems disclosed herein. The process of performing charging engine operations, as per FIG. 11, begins with the receipt of a usage request by the charging engine (1100). Such can be the case, for example (and as depicted in various of the figures), where a mediation system sends such a usage request as a result of the mediation system receiving a request for service from a subscriber. Next, based on information in the usage request, the charging engine resolves subscriber's identity, and makes a determination as to the subscriber's sharing group affiliation(s), if any (1110), which can be accomplished using the subscriber's identity, for example. If the charging engine determines that the subscriber is a member of one or more sharing groups, the charging engine determines whether the usage request is against the shared balance of one of those sharing groups (and the identity thereof) (1120). If the usage request is not against a shared balance, the charging engine proceeds to impact the individual balance in question, accounting for the usage request vis-à-vis the individual balance (1130). The charging engine then processes any individual balance thresholds set for the individual balance in question (1140).

Next, the charging engine makes a determination as to whether the usage request has breached (e.g., reached or exceeded) any applicable individual thresholds (1150). If any individual thresholds are exceeded, the charging engine generates an individual threshold notification, and communicates that notification to the network (e.g., mediation system) (1160).

If the usage request is against a shared balance (1120), however, the charging engine makes a determination as to whether any shared thresholds have been breached (e.g., reached or exceeded) (1170). If the usage request does not result in any shared thresholds being exceeded, the process concludes. However, if the usage request does result in one or more shared thresholds being exceeded, subscriber information for in sharing group is processed, and the requisite notification generated and sent to the network (1180). After the charging engine notifies the network, the process of performing charging engine operations concludes.

Figure 12:
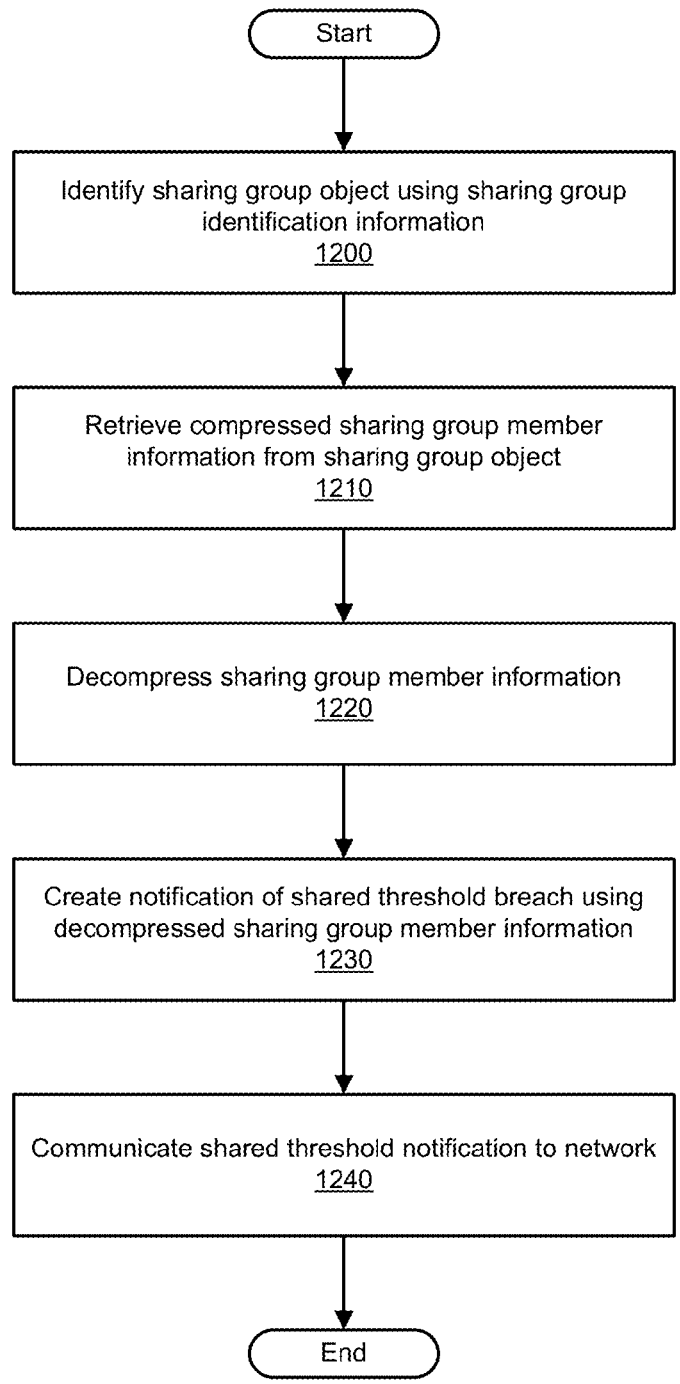
FIG. 12 is a simplified flow diagram illustrating an example of the operations performed when processing a portion of a sharing group notification sequence, according to embodiments of the methods and systems disclosed herein.

FIG. 12 is a simplified flow diagram illustrating an example of the operations performed when processing a sharing group transaction sequence, according to embodiments of the methods and systems disclosed herein. The process of performing subscriber information processing (for subscribers in sharing group) and generating/sending the requisite notifications, as per FIG. 12, can be performed, for example, by a charging engine, such as that described elsewhere herein. The process of FIG. 12 begins with the identification of the sharing group object (or comparable construct) by the charging engine, using sharing group identification information (1200). Next, the charging engine retrieves compressed sharing group member information from the sharing group object (1210). The charging engine then decompresses the (compressed) sharing group member information (1220), and creates a notification message that will be sent to the network (e.g., mediation system) (1230). This notification message facilitates notifying sharing group members of the shared threshold breach. The charging engine creates the notification message using the decompressed sharing group member information. The charging engine then communicates this notification message to the network (e.g., mediation system), in order to provide the requisite information regarding the shared threshold breach to network (1240). The process then concludes.

An Example Computing and Network Environment

As shown above, the systems described herein can be implemented using a variety of computer systems and networks. Examples of such computing and network environments are described below with reference to FIGS. 13 and 14.

Figure 13:
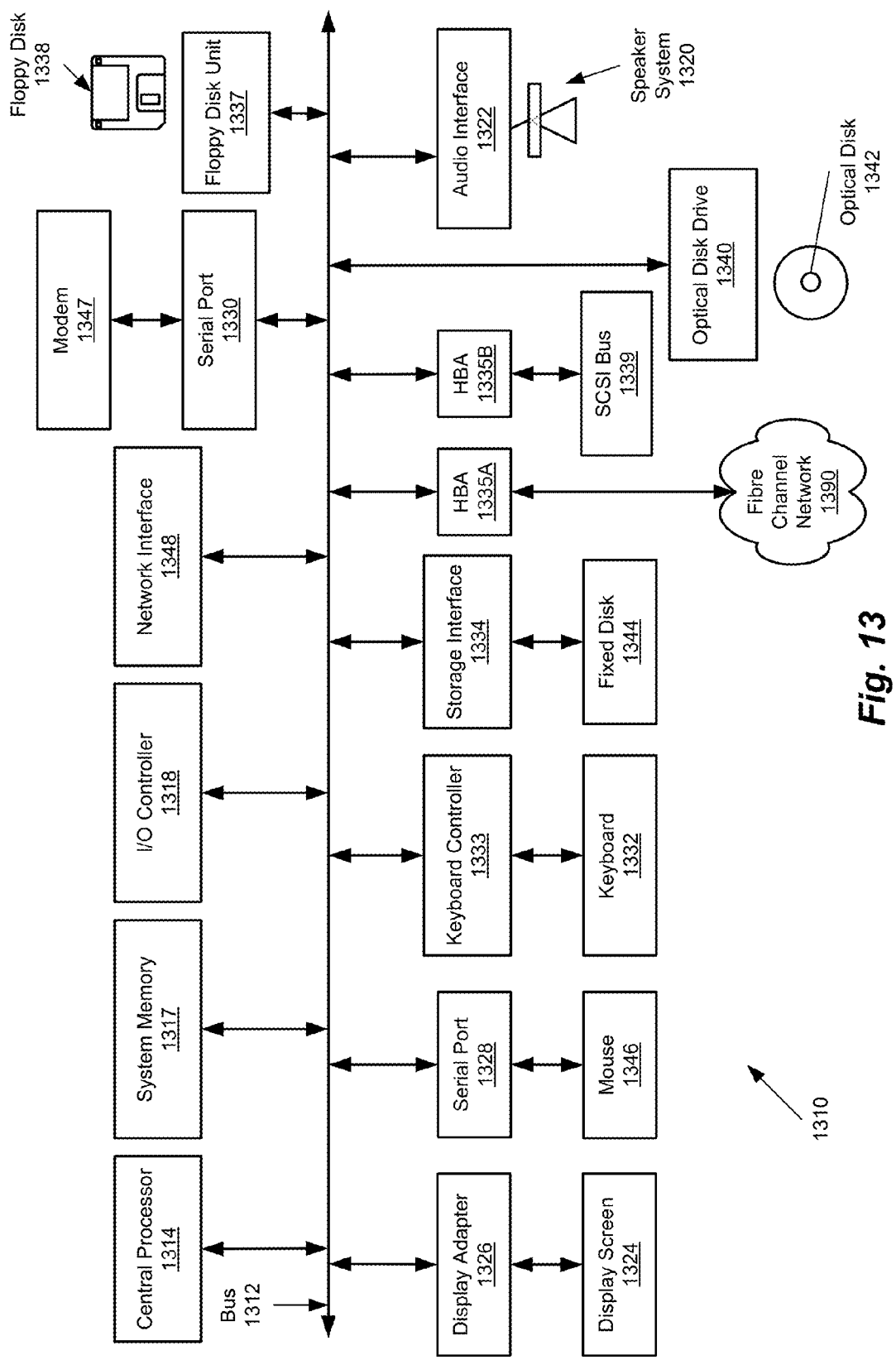
FIG. 13 is a block diagram depicting a computer system suitable for implementing aspects of systems according to embodiments of systems such as those disclosed herein.

FIG. 13 depicts a block diagram of a computer system 1310 suitable for implementing aspects of the systems described herein, and the like. Computer system 1310 includes a bus 1312 which interconnects major subsystems of computer system 1310, such as a central processor 1314, a system memory 1317 (typically RAM, but which may also include ROM, flash RAM, or the like), an input/output controller 1318, an external audio device, such as a speaker system 1320 via an audio output interface 1322, an external device, such as a display screen 1324 via display adapter 1326, serial ports 1328 and 1330, a keyboard 1332 (interfaced with a keyboard controller 1333), a storage interface 1334, a floppy disk drive 1337 operative to receive a floppy disk 1338, a host bus adapter (HBA) interface card 1335A operative to connect with a Fibre Channel network 1390, a host bus adapter (HBA) interface card 1335B operative to connect to a SCSI bus 1339, and an optical disk drive 1340 operative to receive an optical disk 1342. Also included are a mouse 1346 (or other point-and-click device, coupled to bus 1312 via serial port 1328), a modem 1347 (coupled to bus 1312 via serial port 1330), and a network interface 1348 (coupled directly to bus 1312).

Bus 1312 allows data communication between central processor 1314 and system memory 1317, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1310 are generally stored on and accessed from a computer-readable storage medium, such as a hard disk drive (e.g., fixed disk 1344), an optical drive (e.g., optical drive 1340), a floppy disk unit 1337, or other computer-readable storage medium.

Storage interface 1334, as with the other storage interfaces of computer system 1310, can connect to a standard computer-readable medium for storage and/or retrieval of information, such as a fixed disk drive 1344. Fixed disk drive 1344 may be a part of computer system 1310 or may be separate and accessed through other interface systems. Modem 1347 may provide a direct connection to a remote server via a telephone link or to the Internet via an internet service provider (ISP). Network interface 1348 may provide a direct connection to a remote server via a direct network link to the Internet via a POP (point of presence). Network interface 1348 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 13 need not be present to practice the systems described herein. The devices and subsystems can be interconnected in different ways from that shown in FIG. 13. The operation of a computer system such as that shown in FIG. 13 is readily known in the art and is not discussed in detail in this application. Code to implement the modules of the systems described herein can be stored in computer-readable storage media such as one or more of system memory 1317, fixed disk 1344, optical disk 1342, or floppy disk 1338. The operating system provided on computer system 1310 may be MS-WINDOWS®, UNIX®, Linux®, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Further, and as will be appreciated in light of the present disclosure, each of the operations described herein may be executed by a module (e.g., a software module) or a portion of a module, or a computer system user. Thus, the above-described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module.

The software modules described herein may be received by a computer system, for example, from computer-readable storage media. Such computer readable storage media may be permanently, removably or remotely coupled to the computer system. Computer-readable storage media may non-exclusively include, for example, any number of the following: magnetic storage media (including disk and tape storage media); optical storage media such as compact disk media (e.g., CD ROM, CD R, etc.) and digital video disk storage media; nonvolatile memory storage memory including semiconductor-based memory units such as FLASH memory, EEPROM, EPROM, ROM or application specific integrated circuits; and volatile storage media (including registers, buffers or caches, main memory, RAM, etc.). In a UNIX-based embodiment, the software modules may be embodied in a file, which may be a device, a terminal, a local or remote file, a socket, or other such element. Other new and various types of computer-readable storage media may also be used to store the software modules discussed herein.

Many other devices or subsystems (not shown) may be connected in a similar manner (e.g., bar code readers, document scanners, digital cameras and so on). Conversely, it is not necessary for all of the devices shown in FIG. 13 to be present to practice the present invention. The devices and subsystems may be interconnected in different ways from that shown in FIG. 13. The operation of a computer system such as that shown in FIG. 13 is readily known in the art and is not discussed in detail in this application. Code to implement the present invention may be stored in computer-readable storage media such as one or more of system memory 1316, fixed disk 1344, CD-ROM 1342, or floppy disk 1338. Additionally, computer system 1310 may be any kind of computing device, and so includes personal data assistants (PDAs), network appliance, X-window terminal or other such computing device. The operating system provided on computer system 1310 may be MS-DOS®, MS-WINDOWS®, UNIX®, Linux® or other known operating system. Computer system 1310 also supports a number of Internet access tools, including, for example, an HTTP-compliant web browser having a JavaScript interpreter, such as Netscape Navigator®, Microsoft Internet Explorer® and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 14:
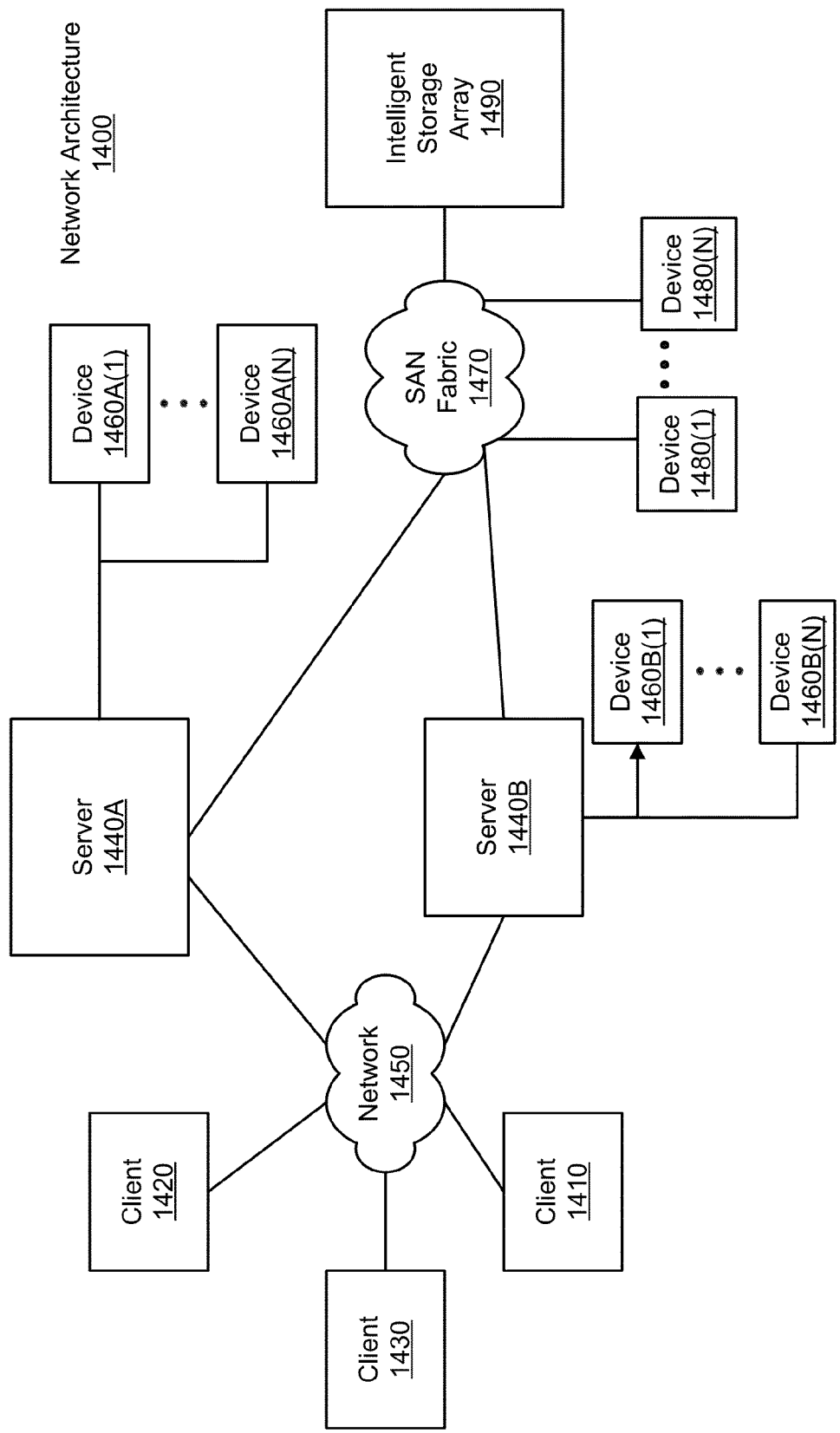
FIG. 14 is a block diagram depicting a network architecture suitable for implementing aspects of systems according to embodiments of systems such as those disclosed herein.

FIG. 14 is a block diagram depicting a network architecture 1400 in which client systems 1410, 1420 and 1430, as well as storage servers 1440A and 1440B (any of which can be implemented using computer system 1410), are coupled to a network 1450. Storage server 1440A is further depicted as having storage devices 1460A(1)-(N) directly attached, and storage server 1440B is depicted with storage devices 1460B(1)-(N) directly attached. Storage servers 1440A and 1440B are also connected to a SAN fabric 1470, although connection to a storage area network is not required for operation. SAN fabric 1470 supports access to storage devices 1480(1)-(N) by storage servers 1440A and 1440B, and so by client systems 1410, 1420 and 1430 via network 1450. Intelligent storage array 1490 is also shown as an example of a specific storage device accessible via SAN fabric 1470.

With reference to computer system 1310, modem 1347, network interface 1348 or some other method can be used to provide connectivity from each of client computer systems 1410, 1420 and 1430 to network 1450. Client systems 1410, 1420 and 1430 are able to access information on storage server 1440A or 1440B using, for example, a web browser or other client software (not shown). Such a client allows client systems 1410, 1420 and 1430 to access data hosted by storage server 1440A or 1440B or one of storage devices 1460A(1)-(N), 1460B(1)-(N), 1480(1)-(N) or intelligent storage array 1490. FIG. 18 depicts the use of a network such as the Internet for exchanging data, but the systems described herein are not limited to the Internet or any particular network-based environment.

The foregoing described embodiments wherein the different components are contained within different other components (e.g., the various elements shown as components of computer system 1310, discussed subsequently). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Other Embodiments

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:
1. An apparatus comprising:
 a charging engine, wherein
   the charging engine is configured to, in response to receipt of a usage request, determine whether a shared balance threshold has been breached, wherein the shared balance threshold is for a sharing group, and the sharing group comprises a plurality of members; and
   in response to a determination that the balance threshold has been breached, generate a notification message using sharing group information stored in a sharing group object, wherein the sharing group object is compressed until the balance threshold has been breached or until a prior balance threshold has been breached, and
   send the notification message to a network element, the usage request is made on behalf of a first member of the plurality of members, and
   the notification message is configured to identify a second member of the plurality of members, further comprising:
 a mediation system, wherein the mediation system is configured to receive a request from the first member, generate the usage request, and submit the usage request to the charging engine.

2. The apparatus of claim 1, wherein the charging engine is configured to determine by virtue of being further configured to:
 impact the shared balance, wherein
   the shared balance is impacted using member information and sharing group information.

3. The apparatus of claim 2, wherein the charging engine is further configured to determine by virtue of being further configured to:
 produce the member information by resolving at least one member of the plurality of members, wherein
   the at least one member comprises the second member; and
 produce the sharing group information by resolving the sharing group.

4. The apparatus of claim 2, wherein the charging engine is configured to generate the notification message by virtue of being further configured to:
 producing member identification information by processing a sharing group object, wherein
   the member identification information is comprised in the sharing group object; and
 prepare the notification message, wherein
   the notification message comprises the member identification information.

5. The apparatus of claim 1, further comprising:
 a mediation system, wherein
   the mediation system is configured to
     receive the notification message,
     generate a notification, and
     send the notification to the second member.

6. The apparatus of claim 1, wherein
 the notification message is configured to identify a subset of the plurality of members, wherein
   the subset of the plurality of members comprises at least two members of the plurality of members.

7. The apparatus of claim 6, further comprising:
 a mediation system, wherein
   the mediation system is configured to
     receive the notification message,
     determine one or more members of the subset of the plurality of members, and
     send a notification to each of the one or more members.

8. The apparatus of claim 1, wherein the notification message is configured to identify the first member, in addition to being configured to identify the second member.

* * * * *

UNITED STATES PATENT AND TRADEMARK OFFICE
CERTIFICATE OF CORRECTION

PATENT NO. : 9,553,998 B2
APPLICATION NO. : 14/620895
DATED : January 24, 2017
INVENTOR(S) : Permude Page 1 of 1

It is certified that error appears in the above-identified patent and that said Letters Patent is hereby corrected as shown below:

On the Title Page

On page 2, Column 1, under Other Publications, Line 6, delete "telecommunication" and insert -- telecommunications --, therefor.

On page 2, Column 2, under Other Publications, Line 18, delete "Hieracrchy" and insert -- Hierarchy --, therefor.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*